(12) United States Patent
Kim et al.

(10) Patent No.: US 6,556,397 B2
(45) Date of Patent: Apr. 29, 2003

(54) DEVICE AND METHOD FOR DETECTING ARC FAULT

(75) Inventors: Jeong-Wan Kim, Gyeonggi-do (KR); Cheon-Youn Kim, Incheon (KR); Dong-Sub Kim, Gyeongsangbuk-do (KR); Gi-Jong Ban, Gyeonggi-do (KR)

(73) Assignee: Human El-Tech, Inc., Gyeonggi-do (KR)

( * ) Notice: Subject to any disclaimer, the term of this patent is extended or adjusted under 35 U.S.C. 154(b) by 0 days.

(21) Appl. No.: 10/016,683

(22) Filed: Dec. 17, 2001

(65) Prior Publication Data

US 2002/0085327 A1 Jul. 4, 2002

Related U.S. Application Data

(63) Continuation-in-part of application No. 09/852,117, filed on May 10, 2001.

(30) Foreign Application Priority Data

May 12, 2000 (KR) .................................. 2000-0025385
Apr. 25, 2001 (KR) .................................. 2001-0022392

(51) Int. Cl.$^7$ ............................ G01R 31/12; H02H 3/16
(52) U.S. Cl. ............................ 361/42; 361/87; 324/536
(58) Field of Search ............................ 361/42, 78, 87; 324/536, 514, 508, 509, 541; 335/201

(56) References Cited

U.S. PATENT DOCUMENTS

| | | | | |
|---|---|---|---|---|
| 5,691,869 A | * | 11/1997 | Engel et al. ................... | 361/42 |
| 5,726,577 A | * | 3/1998 | Engel et al. ................. | 324/520 |
| 5,805,398 A | * | 9/1998 | Rae ............................. | 361/42 |
| 5,815,352 A | * | 9/1998 | Mackenzie .................. | 361/111 |
| 5,835,321 A | * | 11/1998 | Elms et al. .................... | 361/45 |

* cited by examiner

Primary Examiner—Kim Huynh
(74) Attorney, Agent, or Firm—Rabin & Berdo, P.C.

(57) ABSTRACT

A device for detecting arc fault which distinguishes harmful arc from the signal generated by operation of a dimmer and start of electronic devices. Signals outputted from a current transformer is attenuated by a resistor which is coupled in parallel to the current transformer. By the attenuation of the resistor, the signal generated by the operation of a dimmer is not determined to be arc in arc determining part. Harmful arc and the signal generated by the start of the electronic device are distinguished by integrating both signals. As the harmful arc lasts for a long time, large signals are integrated in an integrator while the signal generated by the start of electronic device does not last for a long time.

23 Claims, 35 Drawing Sheets maximum(1)    164.8 V
Freq(1) ⨆⨅    58.01 maximum(1)  18.87 V
Freq(1)

maximum(1)   21.37 V
Freq(1) ⎍⎍  60.56 Hz

FULL-WAVE RECTIFICATION SIGNAL

HALF-WAVE RECTIFICATION SIGNAL maximum(1)  22.88 V
Freq(1)  24.27 Hz maximum(1)      8.34 V
Freq(1)      3.71 Hz maximum(1)      9.13 V
Freq(1)

Freq(1)

DEVICE AND METHOD FOR DETECTING ARC FAULT

CROSS-REFERENCE TO RELATED APPLICATION

This application is a Continuation-In-Part of application 09/852,117 filed May 10, 2001.

The entire disclosures of applicants' Korean patent application numbers KR 2000-0025385 and KR 2001-0022392 are incorporated herein by reference.

FIELD OF THE INVENTION

The present invention relates to a device for detecting an arc fault, more particularly the present invention relates to device for detecting an arc fault, which distinguish effectively the harmful arc causes fire from the signal generated by a dimmer and start of an electronic device.

BACKGROUND OF THE INVENTION

Low voltage networks, typically 600 volts and below, are used to distribute electric power in a specified area, such as part of a city, an industrial or a commercial area. Often, the cables in such networks are located underground. Generally, the network is designed to feed at more than one point, and therefore, has multiple sources. Occasionally, the cables fail due to various causes such as thermal degradation, age, moisture or rodent damage. The networks are protected by circuit breakers and in order to isolate the faulty cable and to minimize disruption of the networks, cable limiters are provided at the ends of the cables. Cable limiters are fuse-like devices that only react safely to high voltage and low impedance faults, such as those created by phase-to-phase faults.

Wiring circuit interrupters and current leakage circuit interrupters are commonly used devices for protecting people and property from fire and dangerous electrical faults. Wiring circuit interrupters are used to protect power lines. The circuit interrupters are tripped by the bending of an internal bimetal when excessive current passing through a circuit interrupter is converted to heat. The circuit interrupters are also tripped causing the bimetal to heat up and bend when an electric tool or other metallic object on the load shorts the power line and high current is passed through instantaneously. This causes the electric device to be interrupted by the inner magnet of the circuit interrupter.

It is known in this field that the current leakage circuit interrupter has the ability to detect current leakage that may be present in the power line. It trips the circuit interrupter and so protects people from the electric shock resulting from current leakage.

In America, according to the current regulations, a ground fault circuit interrupter (GFCI) is presently used in applications where direct human contact is possible. The GFCI, which is able to detect current leakage with high sensitivity, is used in current leakage circuit interrupters. Thus, a GFCI must be installed in all kitchens, bathrooms, parking places basements or other damp places.

In spite of the wiring circuit interrupter and current leakage circuit interrupter, many electrical fires occur all over the world every year. These occur because an arcing type fault to ground occurs rather than a phase-to-phase fault. Arcing faults typically create root mean square (RMS) current values, which are below the thermal threshold for such breakers. Even so, the arcs can cause damage or a fire if they occur near combustible material.

Arcs are potentially dangerous due to their high temperatures. An arc, however, will only trip a GFCI if it produces sufficient leakage current to ground. In addition, an arc will trip a circuit breaker only if the current, flowing through the arc, exceeds the trip parameters of the thermal/magnetic mechanism of the circuit breaker. Therefore, an additional type of protection device is needed to detect and interrupt arcs that do not meet these criteria. An arc detector whose output is used to trigger a circuit interrupting mechanism is referred to as an arc fault circuit interrupter (AFCI).

According to the Consumer Product Safety Commission (CPSC), it was estimated that 40% of the fires in 1997 were due to arc faults. The National Electric Code (NEC) requires AFCI installation in all the residential buildings beginning in January 2002. The causes of arcing are numerous. For example, it may be caused by overuse, excessive currents or lightning strikes, loose connection or excessive mechanical damage to insulation and wires.

Three types of arcing may occur in residential or commercial buildings: series arcing, parallel arcing and ground arcing.

Series (or contact) arcing occurs between two contacts in series with a load. An example of series arcing is illustrated in FIG. 1. The conductors 14, 16 comprising the cable 10, are separated and surrounded by an insulator 12. A portion of the conductor 14 is broken, creating a series gap 18 in the conductor 14. Under certain conditions, arcing will occur across this gap, producing a large amount of localized heat. The heat produced by the arcing might be sufficient to break down and carbonize the insulation 19 close to the point of arcing. If the arc is allowed to continue, enough heat will be generated to start a fire. Under there conditions, current flowing through the arc is controlled by the load.

A schematic diagram illustrating an example of parallel (line) arcing is shown in FIG. 2. The cable 20 comprises electrical conductors 24, 26 covered by outer insulation 22 and separated by inner insulation 28. Deterioration or damage to the inner insulation 28 at 21 may cause parallel fault arcing 23 to occur between the two conductors 24, 26. The inner insulation could have been carbonized by an earlier lighting strike to the wiring system, or it could have been cut by some mechanical action such as a metal chair leg cutting into an extension cord.

A schematic diagram illustrating an example of ground arcing occurring between a conductor and the ground is shown in FIG. 3. If the outer insulation 38 for protecting conductors 34, 36 is damaged, the conductor 36 contacting the ground at the damaged portion 39 produces arcing.

The arcing current may be changed by impedance because parallel arcing and ground arcing occur parallel to the load. The long-term deterioration causes cable carbonization and damage to the coating. The cable is further deteriorated by Joule heat, which is induced by arcing current. The arcing is generated in the following manner: J (Joule heat)=$I^2$(arcing current)×t(Time).

An example of static current and arcing current in the resistor load are illustrated in FIG. 4. The arcing current 42 is not a normal sine wave but is distorted at the phase changing point. According to the distortion of arcing the current, the arcing voltage also is distorted. FIG. 5 shows the relation between arcing current and arcing voltage.

An example of distorted AC line voltage caused by arcing current is illustrated in FIG. 6. The Joule heat is increased against the decrease of RMS AC line voltage value 61 caused by irregular arcing current 62. An arc is superposed on the AC line voltage. The frequency of harmonic or overtone is extended to the GHz range, and it can be seen by spectrum analysis of the frequency of arcing current.

The major problem associated with any type of arc detection is false tripping. False tripping occurs when an arc detector produces a warning output, or disconnects a section of wiring from the voltage source, when a dangerous arcing condition does not actually exist. This problem is caused by the fact that arcing current and arcing voltage are not generated in the form of correct sine wave, and have various types of waveforms. Specifically, arcing current and arcing voltage are similar to the driving pulse generated by the start of the electronic devices, such as fans and dryers that have electric motors inside.

FIG. 7 illustrates the signals related to output voltage in the resistor load, and FIG. 8 illustrates the output voltage with arcing. And, FIG. 9 illustrates an output voltage waveform generated by the start of the electronic device.

The signals in FIG. 7 show that under a normal load, the output voltage is generated to pulse every 1/60 sec. The signals in FIG. 8 show that under arcing conditions, an arcing voltage with high amplitude is detected every 1/60 sec. Also, if you use an electronic device, you can see that at the beginning of a cycle, high pulse similar to the arcing voltage is generated, and after a period of time, output voltage will have the normal amplitude (See FIG. 9). Therefore, it is difficult to detect arcing because an arcing voltage is similar to a pulse generated by the start of the electronic device at the beginning of a cycle.

As mentioned above, the output voltage when a harmful arc has occurred and the output voltage when the electric device starts are similar, and therefore, it is difficult to distinguish the harmful arc from a starting pulse.

There is another case that the circuit is tripped although the harmful arc has not occurred, which is the case that the signal by the operation of a dimmer occurs.

The signal generated by the operation of the dimmer not only is similar with the harmful arc in waveform but also lasts a long time like a harmful arc. Therefore, the arc fault detector of the prior art has tripped the circuit when the signal by the operation of the dimmer has been generated.

SUMMARY OF THE INVENTION

In order to resolve the above-described problems in the conventional circuit breaker, the present invention intends to provide a device for detecting an arc fault, which is able to detect the arc fault more effectively to protect people from a fire.

Another purpose of the present invention is to provide a device for detecting an arc fault, which distinguishes the harmful arc from the signal generated by the start of the electronic device.

Another purpose of the present invention is to provide a device for detecting an arc fault, which distinguishes the harmful arc from the signal generated by the operation of the dimmer.

In order to achieve the above-mentioned purposes, a device is provided for detecting arc fault coupled to a conductor coupling a source and a load, the device comprising current detecting means, which detects a variance of current on the conductor and generates a current detection signal proportional to the variance of the current; signal attenuating means, which attenuates the current detection signal outputted from the current detecting means; signal transforming means, removes noises of from a signal out from the signal attenuating means and limits the level of the output signal from the signal attenuating means to a predetermined level; means for determining an arc fault occurrence, which compares an output signal from the signal transforming means with a predetermined first reference signal level and generates an arc detection signal if the output signal level from the signal transforming means is higher than the first reference signal level; means for determining a trip of the conductor, which integrates the arc detection signal and generates a trip signal if the integrated arc detection signal level is higher than a predetermined second signal level.

The current detecting means may comprise a current transformer which generates an output voltage proportional to the variance of current on the conductor.

The signal attenuating means may comprise a resistor coupled in parallel to the current transforming means.

The signal transforming means may comprise a rectifier that rectifies the output signal from the signal attenuating means; a first filter that removes low frequency signal from an output signal of the rectifier; a level limiter that limits an output signal of the first filter to a predetermined level if the output signal of the first filter exceeds the predetermined level; a buffer that performs buffering of an output signal of the level limiter; and a second filter that removes low frequency signal from an output signal of the buffer.

The means for determining an arc fault may comprise a first reference signal generator that generates the redetermined first reference signal; and a comparator that compares the output signal from the signal transforming means with the first reference signal.

The means for determining trip of the conductor may comprise an integrator which integrates the arc detection signal; a second reference signal generator which generates the predetermined second reference signal; and a comparator which compares the integrated arc detection signal with the second reference signal.

The rectifier may comprise four diodes in order to perform full-wave rectification The rectifier may comprise one diode in order to perform half-wave rectification.

The first filter may be a high pass filter comprising resistors and capacitors.

The buffer may comprise a bipolar junction transistor.

The level limiter may comprise a zener diode.

The second filter may comprise capacitors and resistors, which constitute a high pass filter and further comprises a bypass capacitor, which removes a direct current signal.

The comparator may comprise an operational amplifier to which the first reference signal and the output signal from the signal transforming means are inputted.

The integrator may comprise at least a resistor and at least a capacitor.

The second reference level generator may comprise a variable resistor by which the second reference level is adjusted.

The comparator of the means for determining that a trip has occurred may comprise an operational amplifier to which the integrated arc detection signal by the integrated and second reference signals are inputted.

The value of the resistor of signal attenuating means is determined so that an output signal level by the operation of a dimmer is lower than the predetermined level in the level limiter.

The value of the resistor of the signal attenuating means is determined so that an output signal level by the operation of a dimmer is lower than the first reference signal level.

DETAILED DESCRIPTION OF THE INVENTION

Hereinafter, preferred embodiments of the present invention will be described in more detail with reference to the accompanying drawings.

Figure 1:
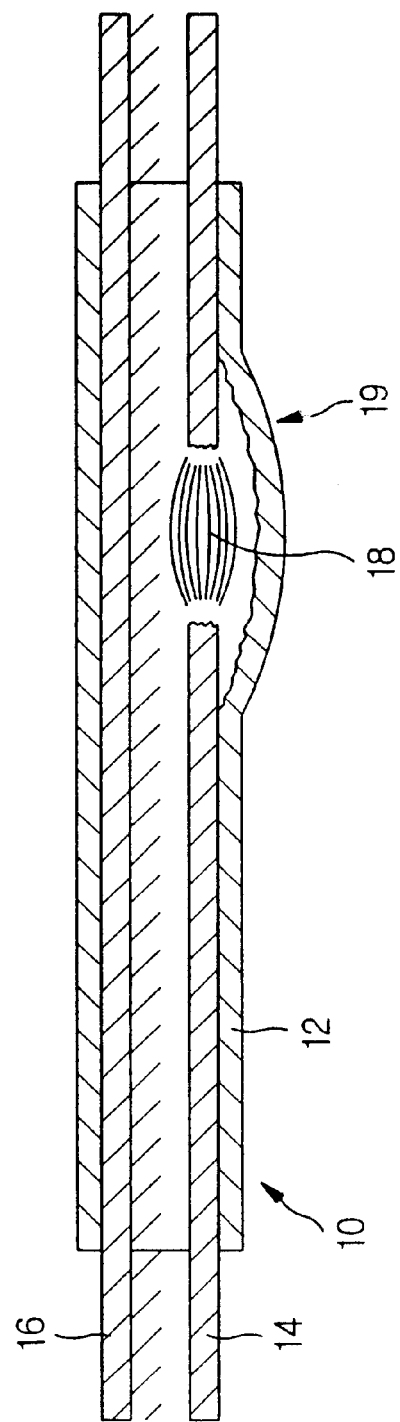
FIG. 1 is a schematic diagram illustrating an example of serial arcing in a current carrying conductor.
Figure 2:
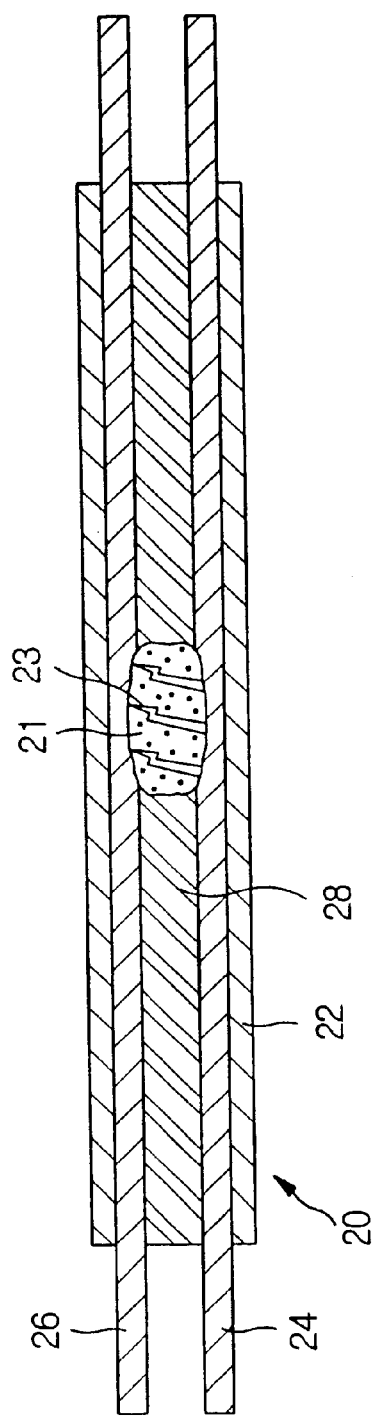
FIG. 2 is a schematic diagram illustrating an example of parallel arcing between two current carrying conductors.
Figure 3:
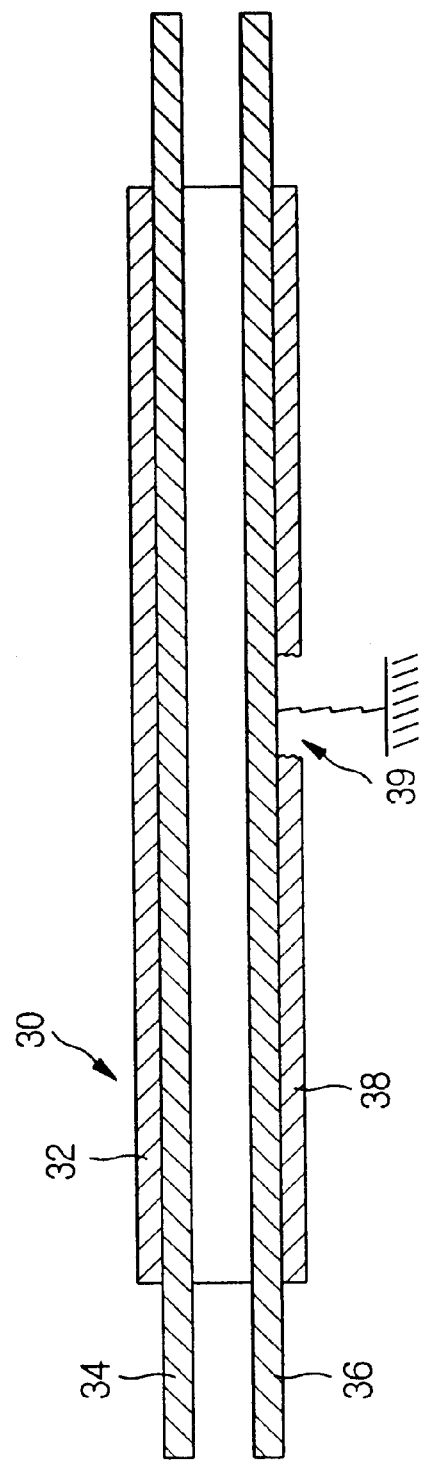
FIG. 3 is a schematic diagram illustrating an example of ground arcing between the current carrying conductor and the ground.
Figure 4:
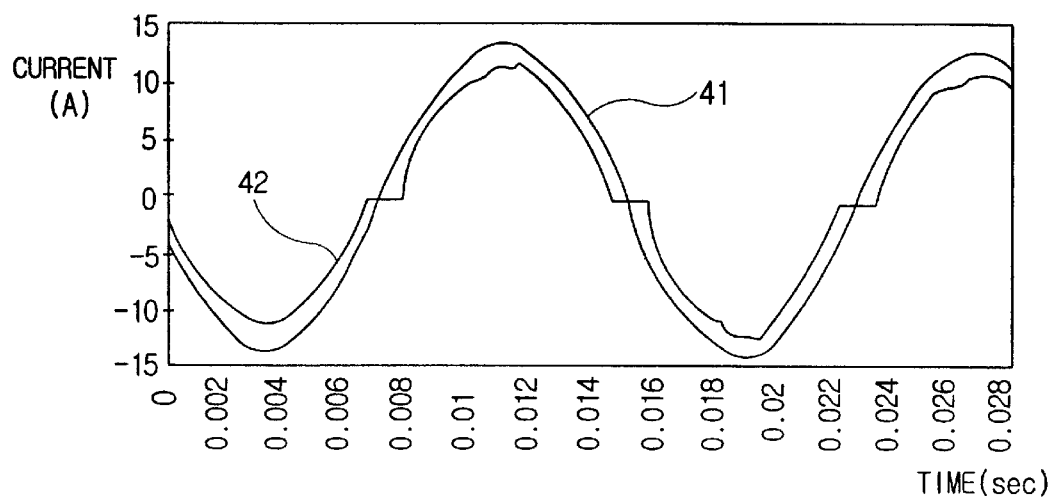
FIG. 4 is a graph illustrating an example of static current and arcing current in the resistor load.
Figure 5:
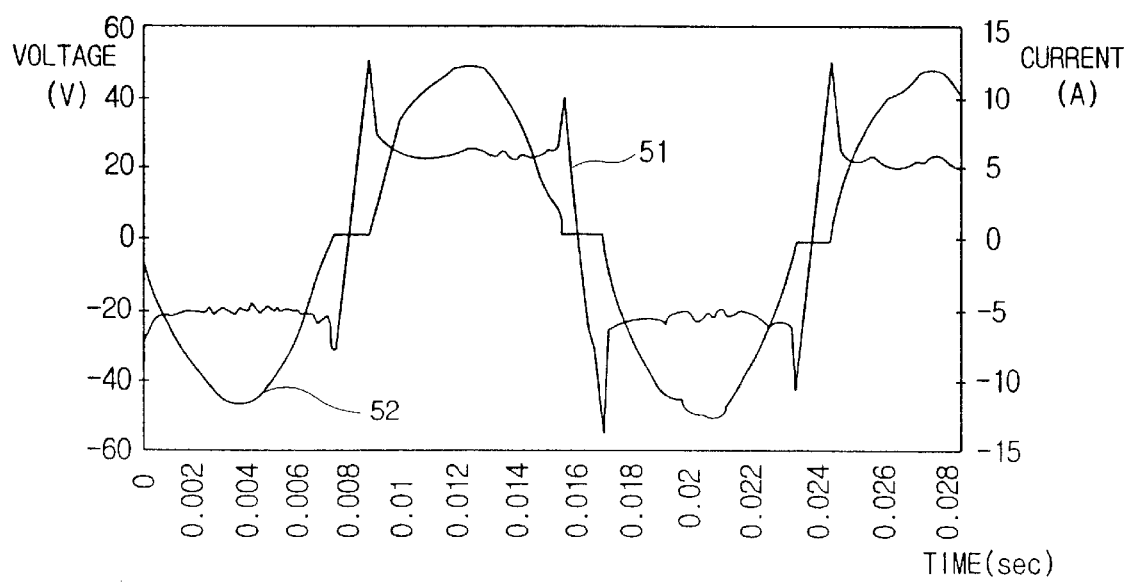
FIG. 5 is a graph illustrating an example of the relation between arcing current and arcing voltage.
Figure 6:
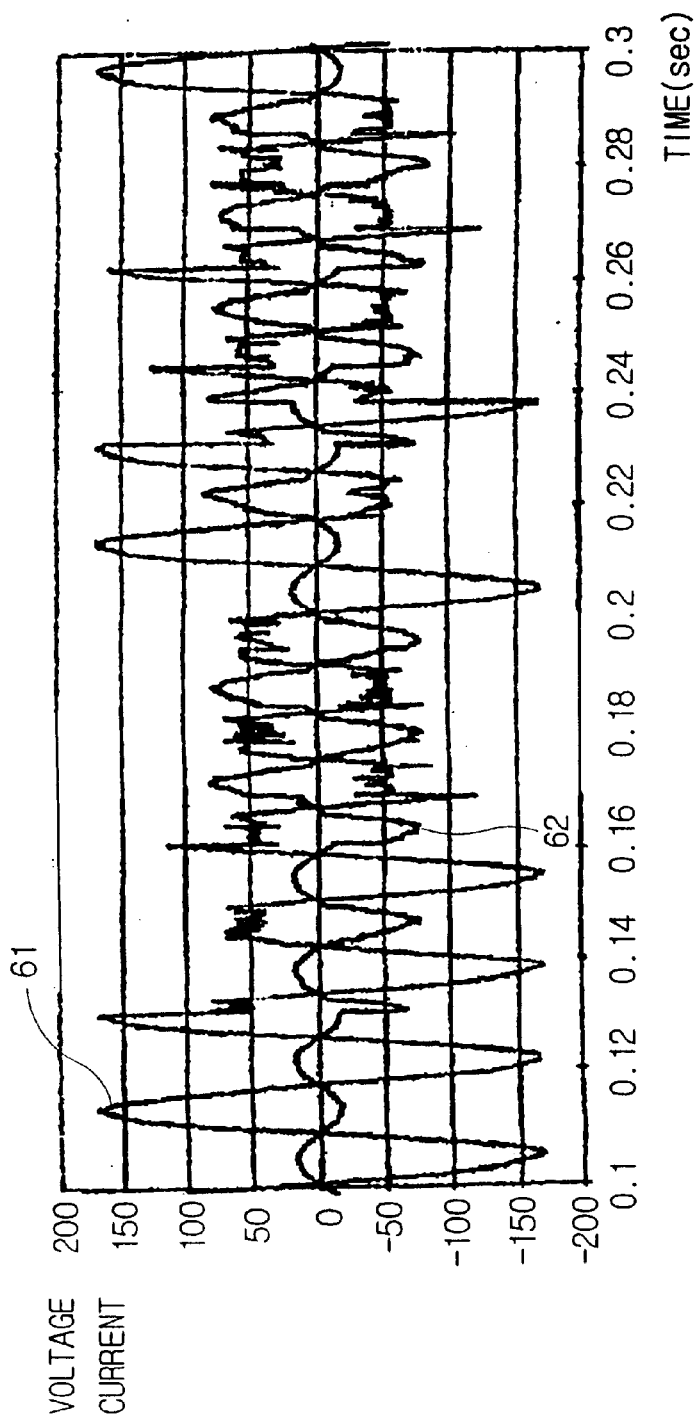
FIG. 6 is a graph illustrating an example of distorted AC line voltage caused by an arcing current.
Figure 7:
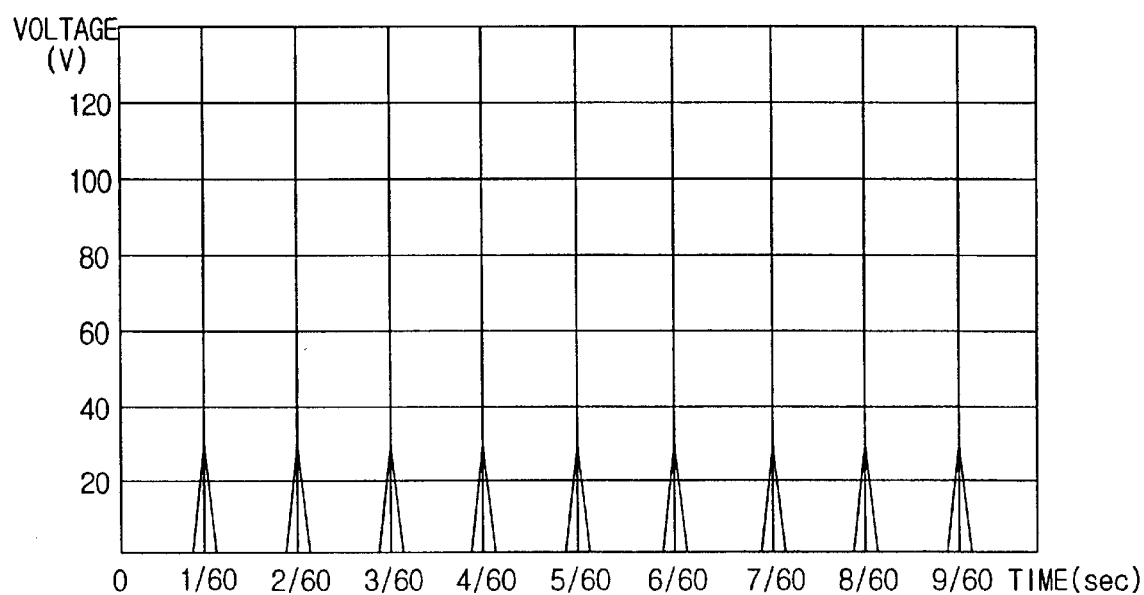
FIG. 7 is a graph illustrating an example of signals related to output voltage in the resistor load.
Figure 8:
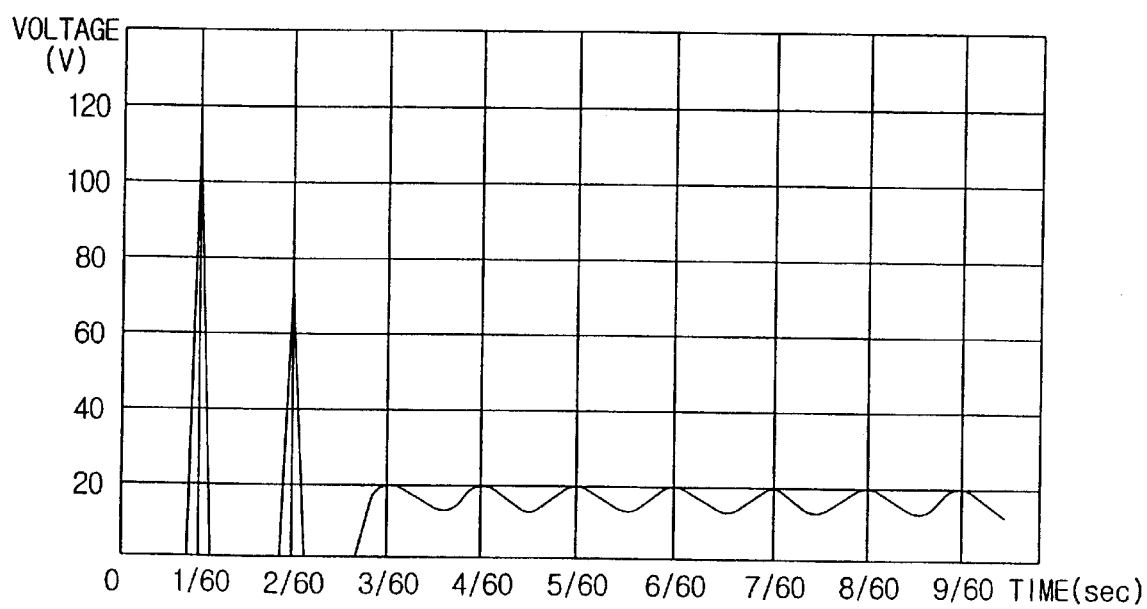
FIG. 8 is a graph illustrating an example of an output voltage with arcing.
Figure 9:
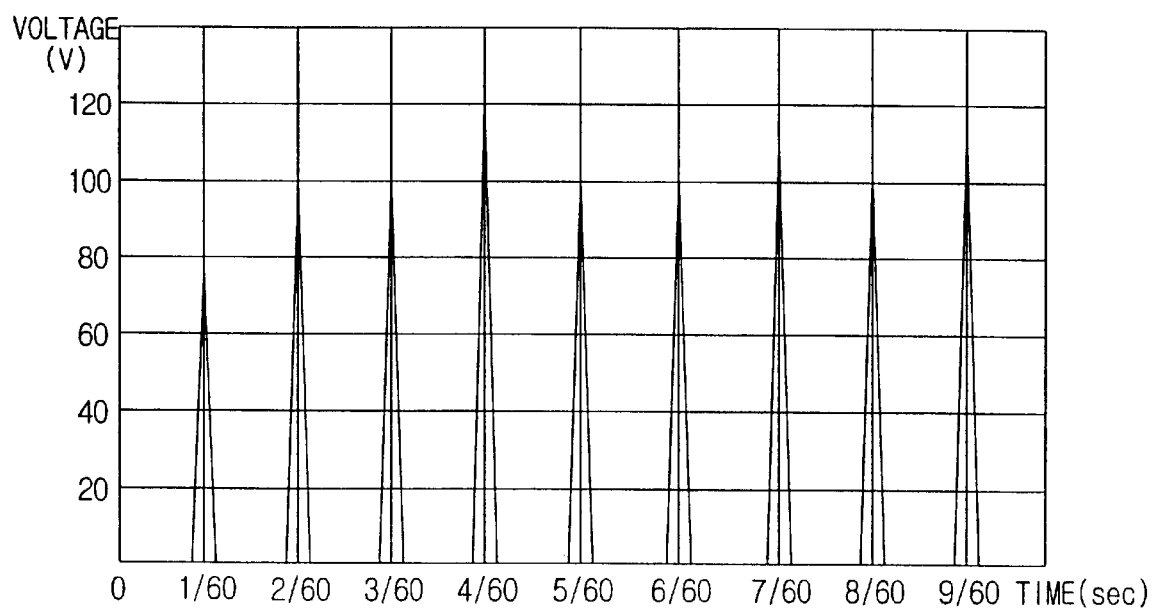
FIG. 9 is a graph illustrating an example of an output voltage waveform in a driving electronic device.
Figure 10:
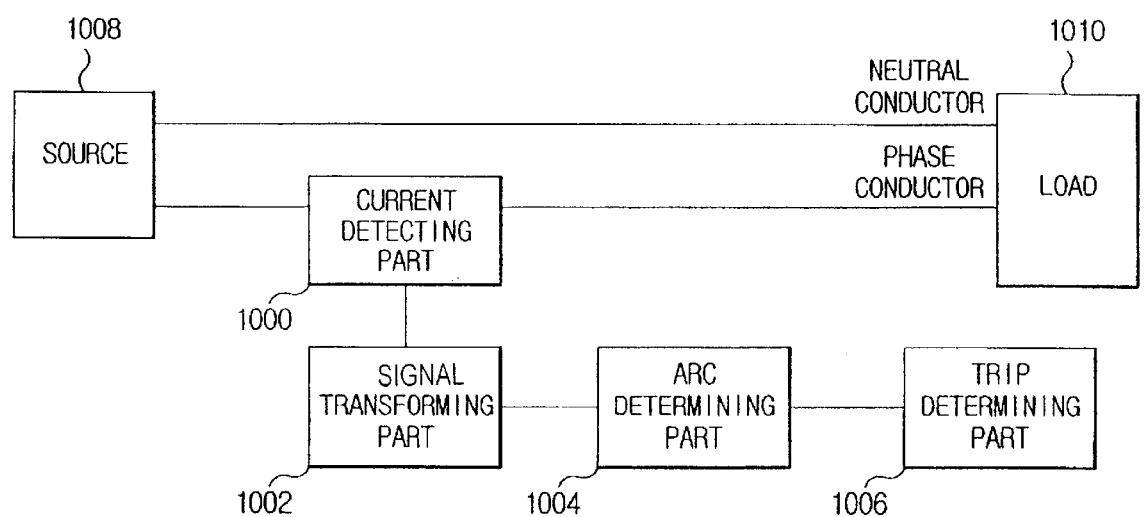
FIG. 10 illustrates a schematic block diagram of the arc fault detection device according to the preferred embodiment of the present invention.

FIG. 10 illustrates a schematic block diagram of the arc fault detection device according to the preferred embodiment of the present invention.

As shown in FIG. 10, the arc fault detecting device according to the preferred embodiment of the present invention may include current detecting part 1000, signal transforming part 1002, arc determining part 1004 and trip determining part 1006.

The current detecting part 1000 detects the variance of the current flowing on the phase conductor and generates a current detection signal. Although it is illustrated that the current detection part 1000 is coupled to the phase conductor in FIG. 10, it is included within the scope of the present invention that current detecting part 1000 is coupled to the neutral conductor or to both of the phase conductor and the neutral conductor.

In accordance with the preferred embodiment of the present invention, the current detecting part 1000 may comprise a current transformer and a resistor coupled in parallel to the current transformer. In case of using the current transformer, the current detection signal may be generated in the form of voltage.

The signal transforming part 1002 transforms the current detection signal outputted from the current detecting part 1000 into a signal adequate to determine if an arc has occurred. The current detection signal outputted from the current detecting part 1000 is an alternating current with very high effective value. Therefore, the signal transforming part 1002 rectifies the current detection signal and limits the level of the current detection signal for stability of the circuit.

The arc determining part 1004 compares the output signal from the signal transforming part 1002 with a reference level and if the output signal level from the signal transforming part 1002 is higher than the reference level, the arc determining part 1004 generates an arc detection signal.

In accordance with the preferred embodiment of the present invention, the signal level may be compared using an operational amplifier or an integrated circuit in which the operational amplifiers are included. In this case, the said reference signal and the said output signal of the signal transforming part 1002 is outputted in the form of a voltage and the level of the voltage is compared.

As mentioned above, the arc is classified as either a harmful arc or a harmless arc. In the arc determining part 1004, if the output signal level from the signal transforming part 1002 is higher than the reference level, the arc determining part 1004 generates the arc detection signal although the harmless arc has occurred.

The trip determining part 1006 integrates the arc detection signal outputted from the arc determining part 1004 and if the integrated signal level is higher than a predetermined reference level, the trip determining part 1006 generates the trip signal so that the phase conductor connecting the source 1008 and the load 1010 is disconnected.

As the arc determining part 1004 generates the arc detection signal in response in response both to the harmful arc and to the harmless arc, the trip determining part generates the trip signal only for the harmful arc.

Figure 11A:
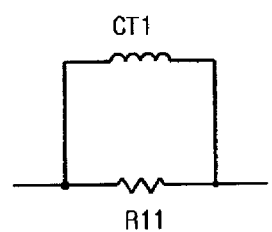
FIG. 11a illustrates a circuit of the current detecting part according to the preferred embodiment of the present invention.

FIG. 11a illustrates a circuit of the current detecting part according to the preferred embodiment of the present invention.

As shown in FIG. 11a, the current detecting part may comprise a current transformer CT1 and a resistor R11 coupled in parallel to the current transformer CT1. The current transformer CT1 generates the current detection signal which is proportional to the variance of the current flowing on the phase conductor in the form of voltage according to Faraday's law. As the variance of the current is very high in the event of the arc occurrence, the resistor R11 attenuates the output voltage of the current transformer CT1.

Figure 11B:
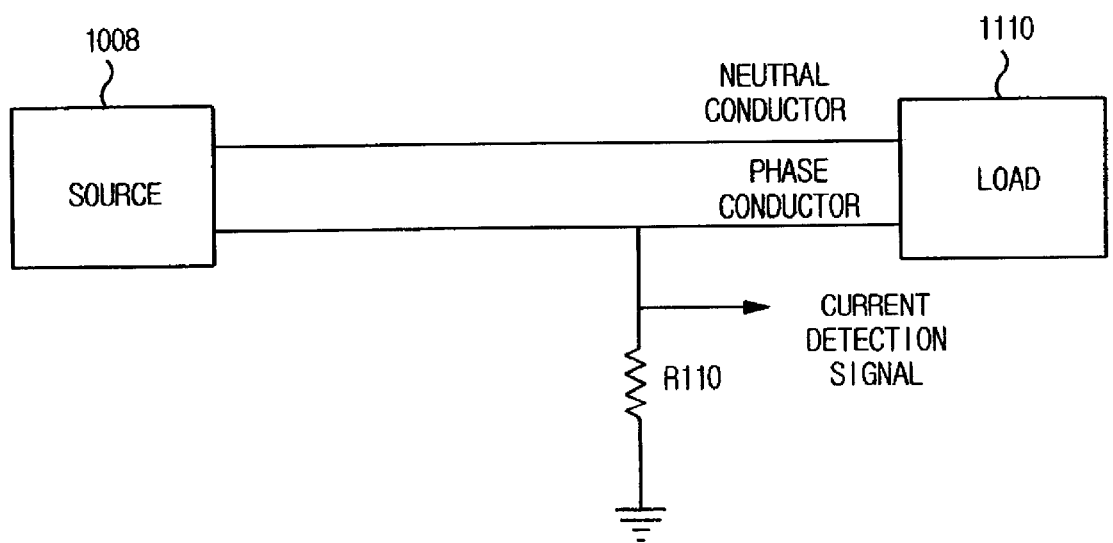
FIG. 11b illustrates a circuit of the current detecting part according to another embodiment of the present invention.

FIG. 11b illustrates a circuit of the current detecting part according to another embodiment of the present invention.

The circuit shown in FIG. 11b is a circuit which detects the current using a shunt method. The shunt method is a method that provides a path other than resistor on which the current flows and measures the magnitude of the current on this other path.

In FIG. 11b, a path with a resistor R110 is illustrated, and the magnitude of current flowing on the resistor R110 is measured. Although it is illustrated that the resistor R110 is coupled to the phase conductor, it is also included in the scope of the present invention to couple the resistor R110 to a neutral conductor or to both of the phase conductor and the neutral conductor.

If the resistor R110 is coupled to the phase wire, current according to the ratio of impedance of the phase conductor and the value of the resistor R110 flows through the resistor R110. As the current flowing through the resistor R110 is proportional to the current flowing on the phase wire, the magnitude of the current can be used to define a current detection signal.

Figure 12A:
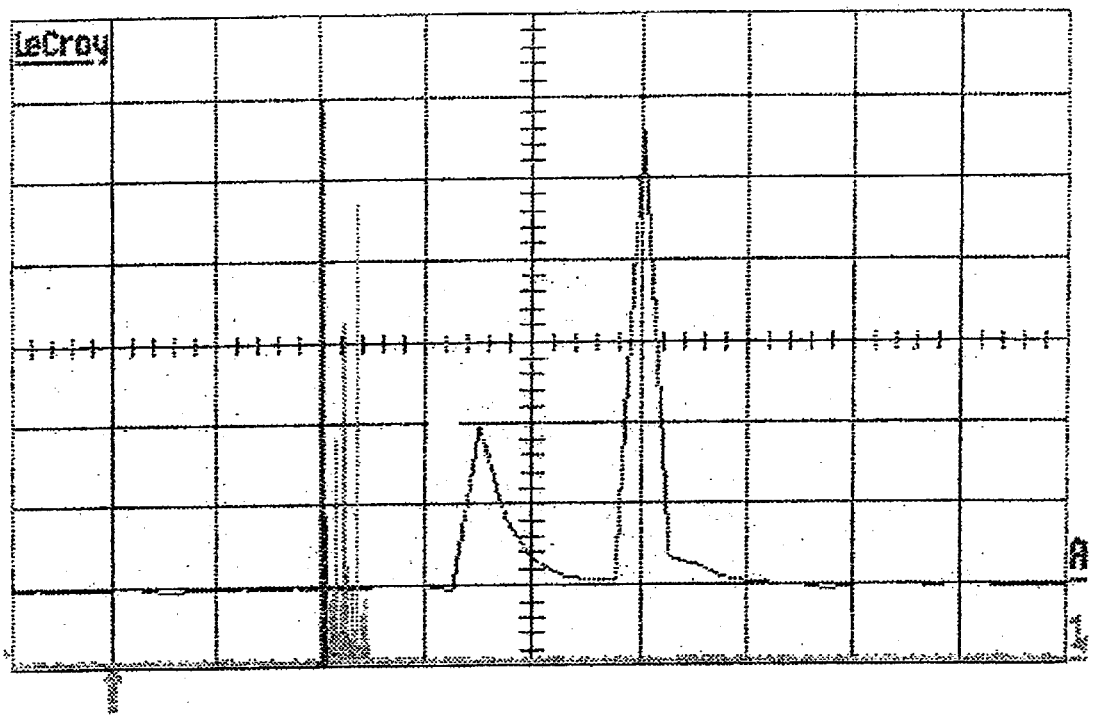
FIG. 12a illustrates a waveform of the signal generated by the start of the electronic device in the current transformer CT1 when the resistor R11 is not coupled.
Figure 12B:
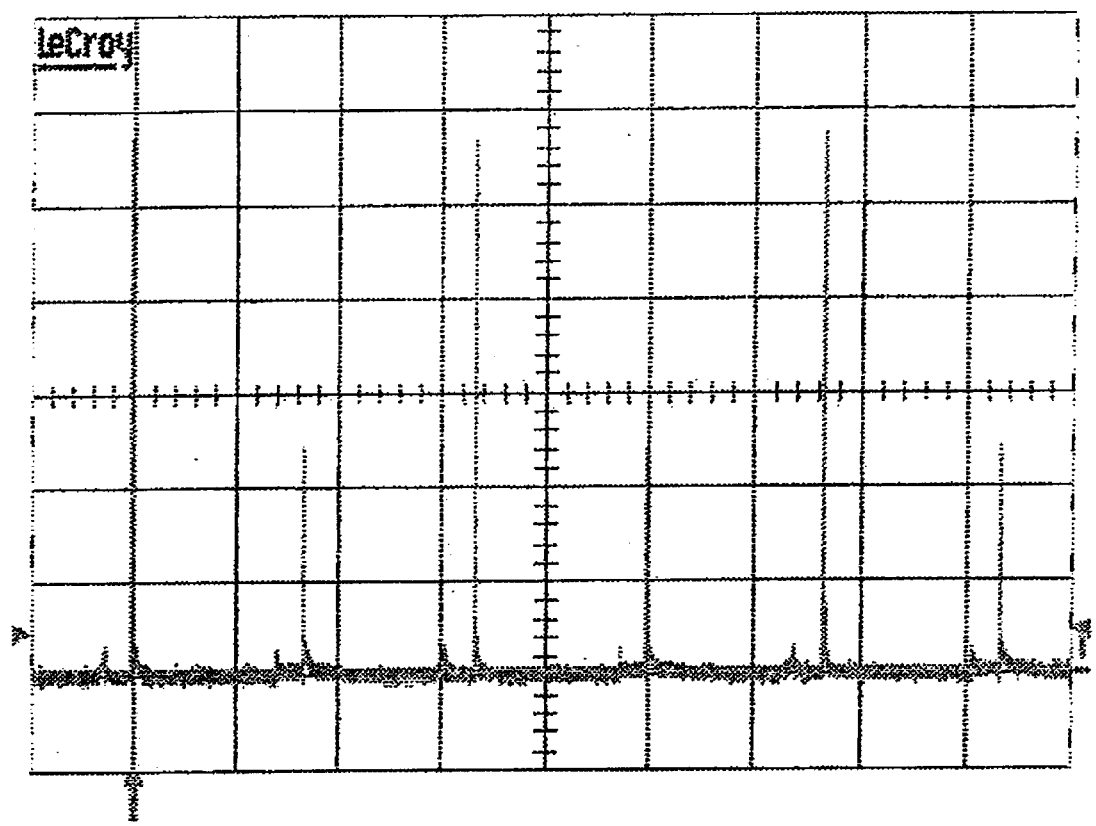
FIG. 12b illustrates a waveform of the signal by the operation of a dimmer in the current transformer CT1 when the resistor R11 is not coupled.
Figure 12C:
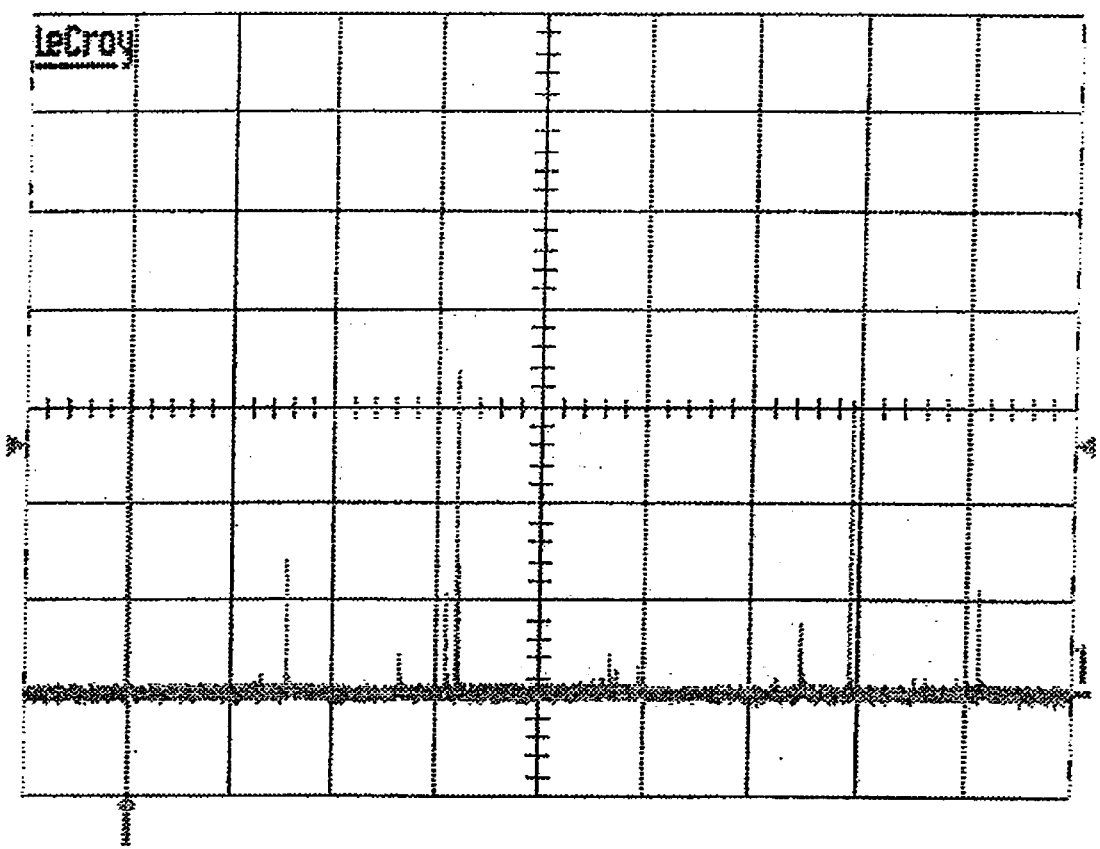
FIG. 12c illustrates a waveform of the signal by the harmful arc in the current transformer CT1 when the resistor R11 is not coupled.

FIG. 12a illustrates a waveform of the signal generated by the start of the electronic device in the current transformer CT1 when the resistor R11 is not coupled, FIG. 12b illustrates a waveform of the signal by the operation of a dimmer in the current transformer CT1 when the resistor R11 is not coupled, FIG. 12c illustrates a waveform of the signal by the harmful arc in the current transformer CT1 when the resistor R11 is not coupled.

As shown in FIG. 12a, 12b, and 12c, the current detection signal level of the current transformer CT1 is very high if the resistor is not coupled.

Figure 13A:
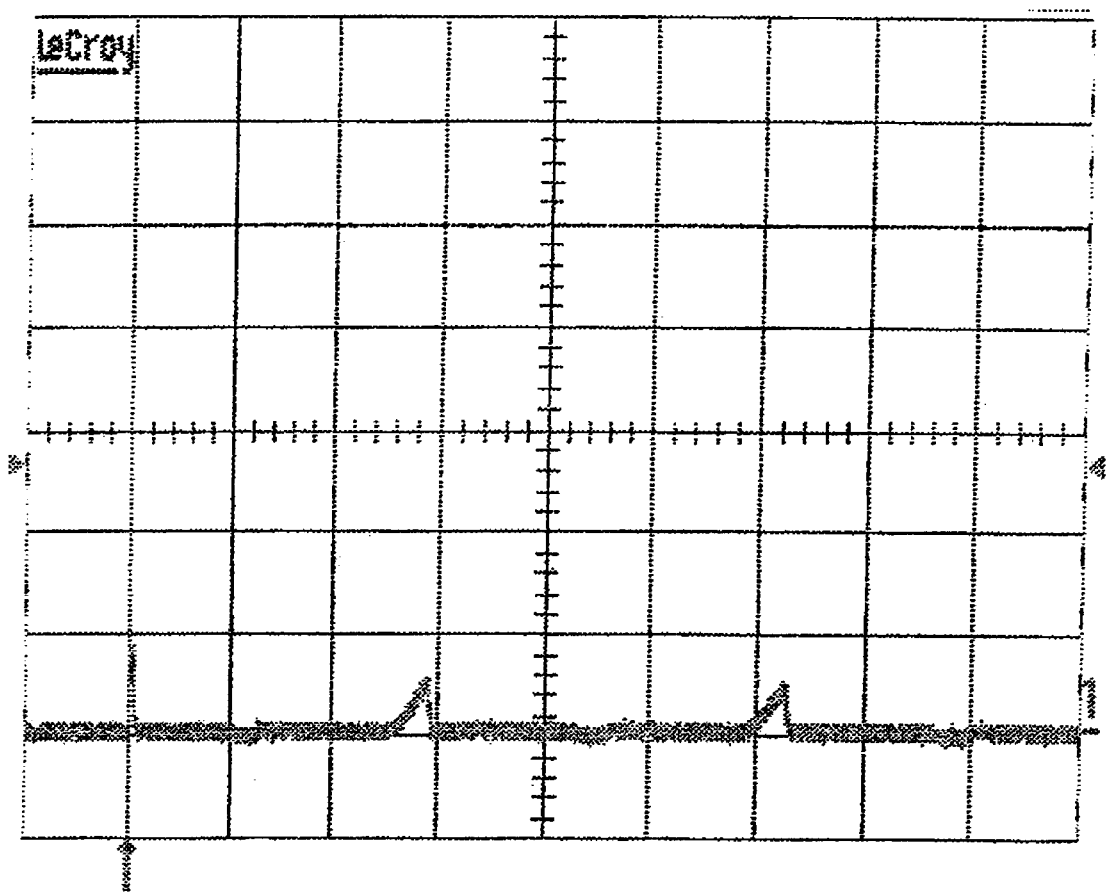
FIG. 13a illustrates a waveform of the signal generated by the start of the electronic device in the current transformer CT1 when the resistor R11 is coupled.
Figure 13B:
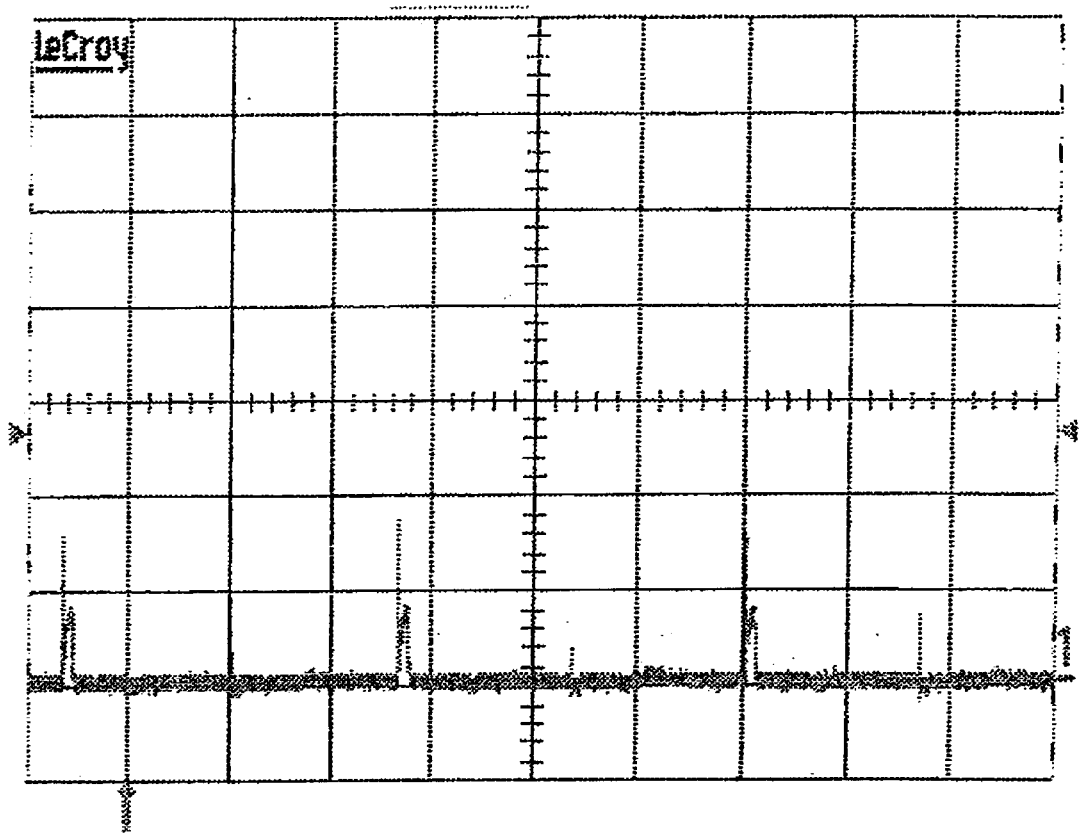
FIG. 13b illustrates a waveform of the signal by the operation of a dimmer in the current transformer CT1 when the resistor R11 is coupled.
Figure 13C:
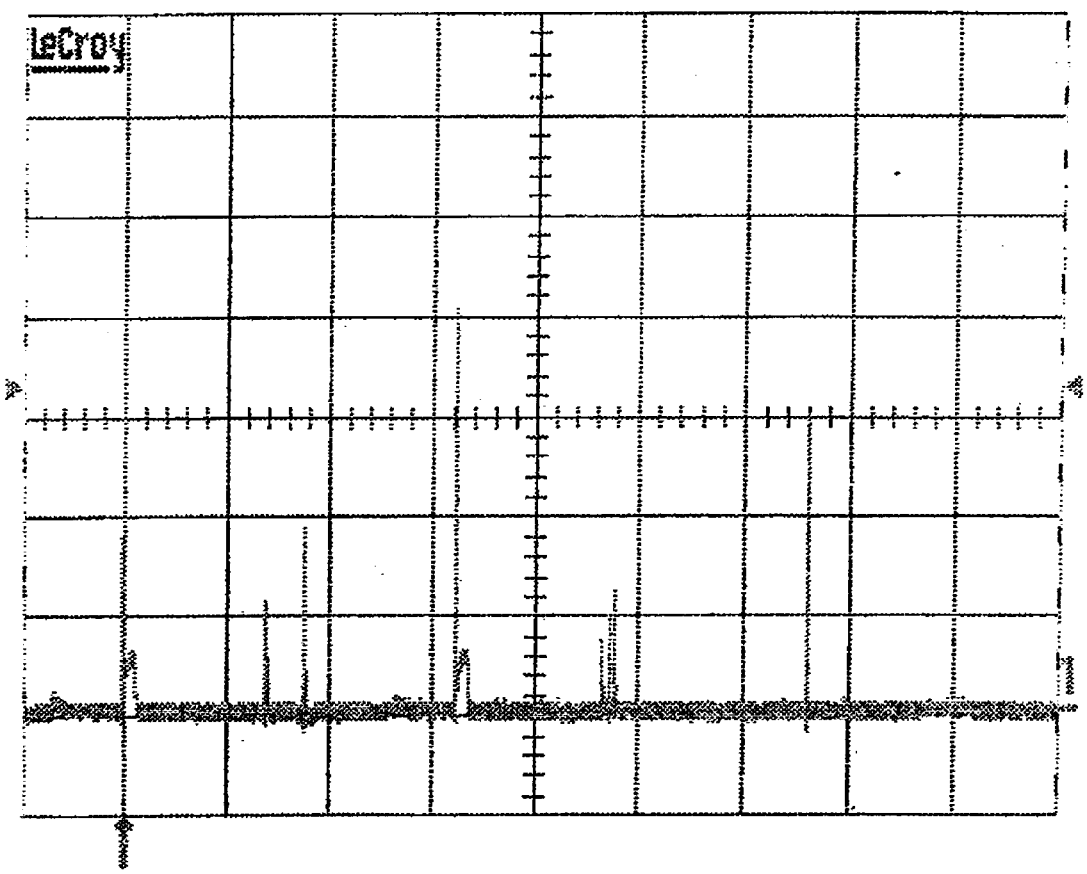
FIG. 13c illustrates a waveform of the signal by the harmful arc in the current transformer CT1 when the resistor R11 is coupled.

FIG. 13a illustrates a waveform of the signal generated by the start of the electronic device in the current transformer CT1 when the resistor R11 is coupled, FIG. 13b illustrates a waveform of the signal by the operation of a dimmer in the current transformer CT1 when the resistor R11 is coupled, FIG. 13c illustrates a waveform of the signal by the harmful arc in the current transformer CT1 when the resistor R11 is coupled.

As shown in FIG. 13a, 13b, and 13c, the current detection signal level is greatly attenuated if the resistor R11 is coupled to the current transformer CT1.

As mentioned above, it is difficult to distinguish the signal generated by the operation of the dimmer from the harmful arc signal as the signal generated by the operation of the dimmer lasts for a long time like the harmful arc signal.

However, as shown in FIG. 13a, 13b and 13c, the signal level generated by the operation of the dimmer is lower than the signal level generated by the start of the electronic device and the harmful arc.

Therefore, in the present invention, the signal generated by the operation of the dimmer is attenuated to the signal level which is lower than the reference signal level in the arc determining part 1004 by adjusting the value of the resistor 11 so that the signal generated by the dimmer is not determined to be an arc.

Figure 14:
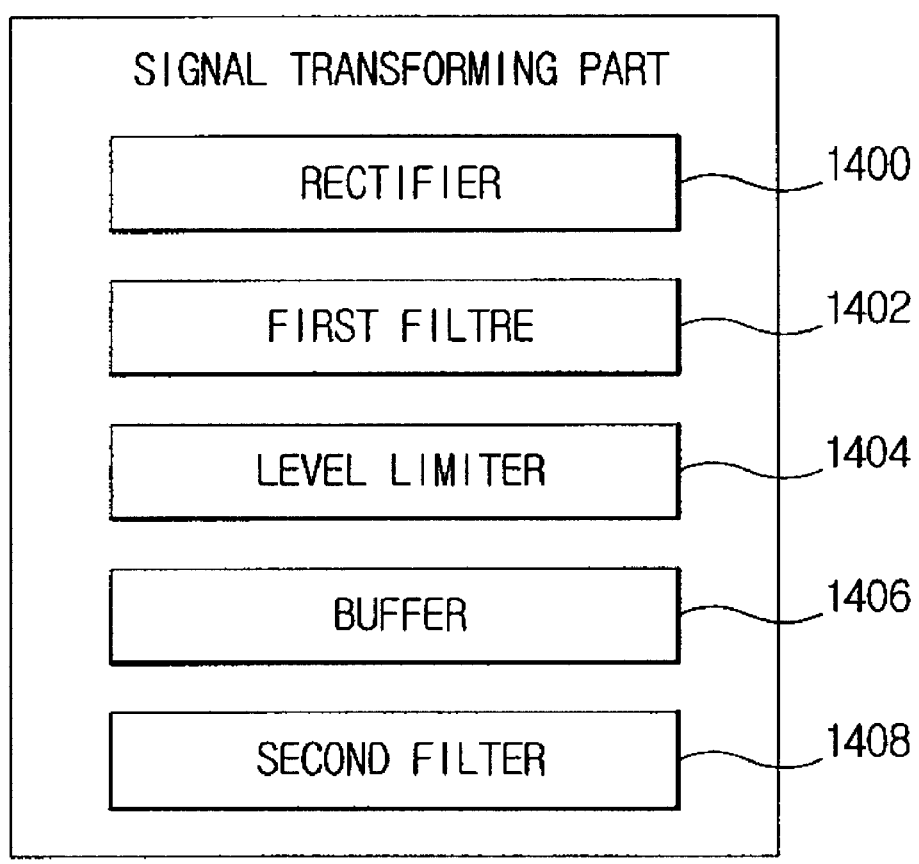
FIG. 14 illustrates a detailed block diagram of the signal transforming part according to the preferred embodiment of the present invention.

FIG. 14 illustrates a detailed block diagram of the signal transforming part according to the preferred embodiment of the present invention.

As shown in FIG. 14 the signal transforming part 1002 according to the preferred embodiment of the present invention may comprise a rectifier 1400, the first filter 1402, the level limiter 1404, a buffer 1406 and the second filter 1408.

The rectifier 1400 rectifies the current detection signal from the current detecting part 1000, the rectifier may comprise general diodes. The full-wave rectification by 4 diodes or the half-wave rectification by one diode would be included in the scope of the present invention.

The first filter 1402 is a high pass filter which blocks the low frequency signal which is unrelated to the arc and passes the only high frequency signal. The signal level outputted from the first filter is lower than that of the current detection signal as the low frequency signal is removed in the first filter.

The first filter may comprise capacitors and resistors and may comprise other means constituting high pass filter.

The level limiter 1404 limits the level of the output signal from the first filter to a predetermined reference level if the output signal from the first filter exceeds the predetermined reference level. If the current detection in the current detecting part 1000 is performed using the current transformer, the signal from the first filter outputted in the form of voltage and the level limiter limits the level of the voltage. For example, if the reference voltage is 20V and the output voltage from the first filter is 25V, the level limiter 1404 limits the voltage level to 20V. The level limiting is for protection of the circuit from the excessive output of voltage.

In accordance with the preferred embodiment of the present invention, the value of the resistor coupled in parallel to the current transformer is determined so that output signal generated by the operation of a dimmer is lower than the reference level of the level limiter 1004. However the signal generated by harmful arc and start of the electronic device may be higher than the reference level of the level limiter 1004.

Figure 18A:
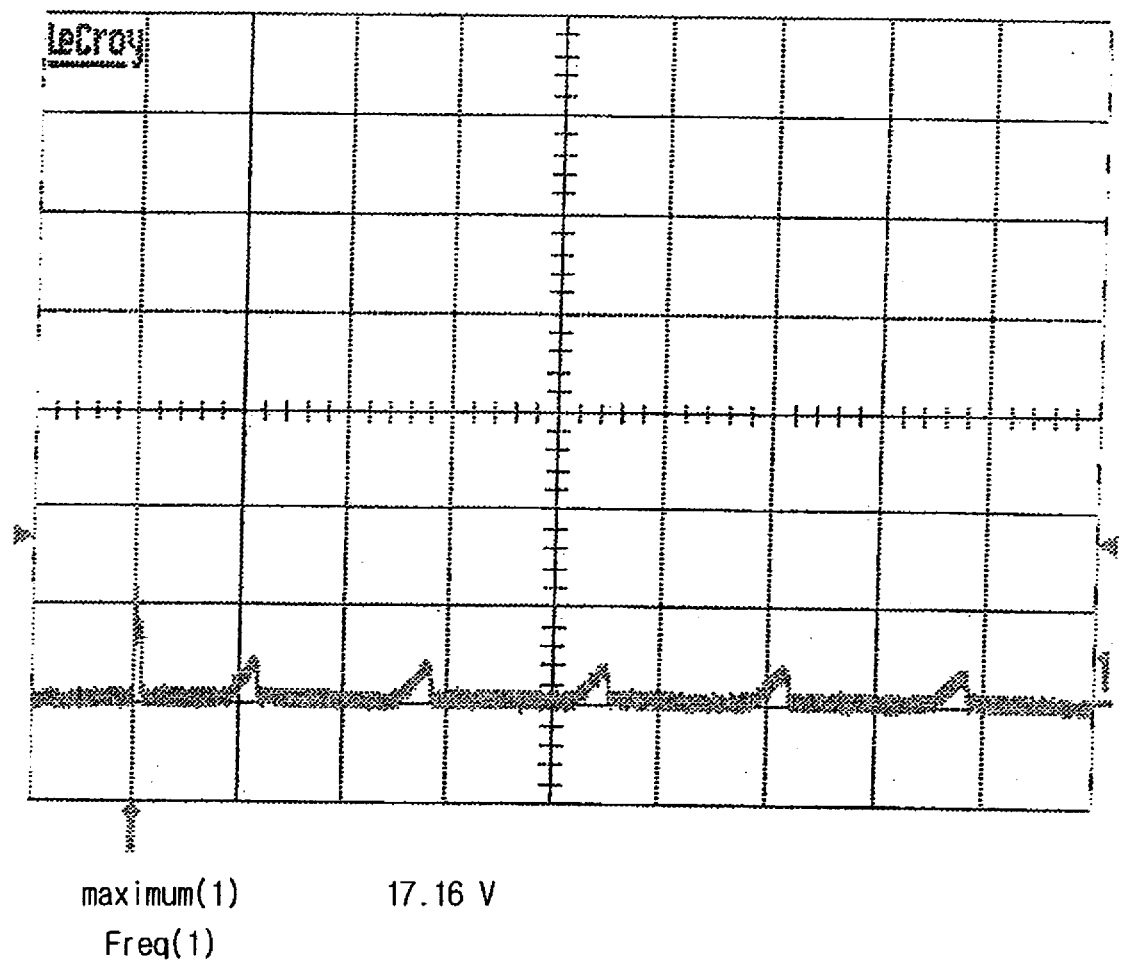
FIG. 18a illustrates a waveform of the signal generated by the start of electronic device in the level limiter.
Figure 18B:
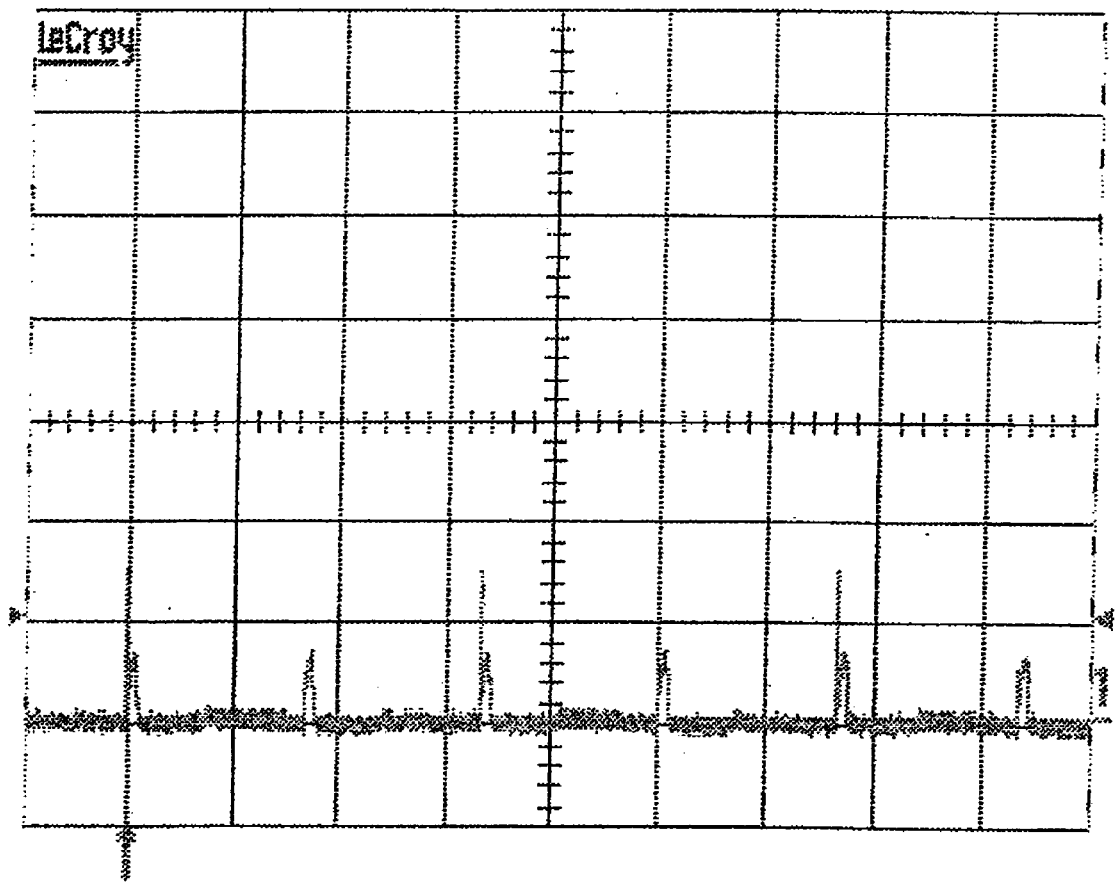
FIG. 18b illustrates a waveform of the signal generated by the operation of the dimmer in level limiter.
Figure 18C:
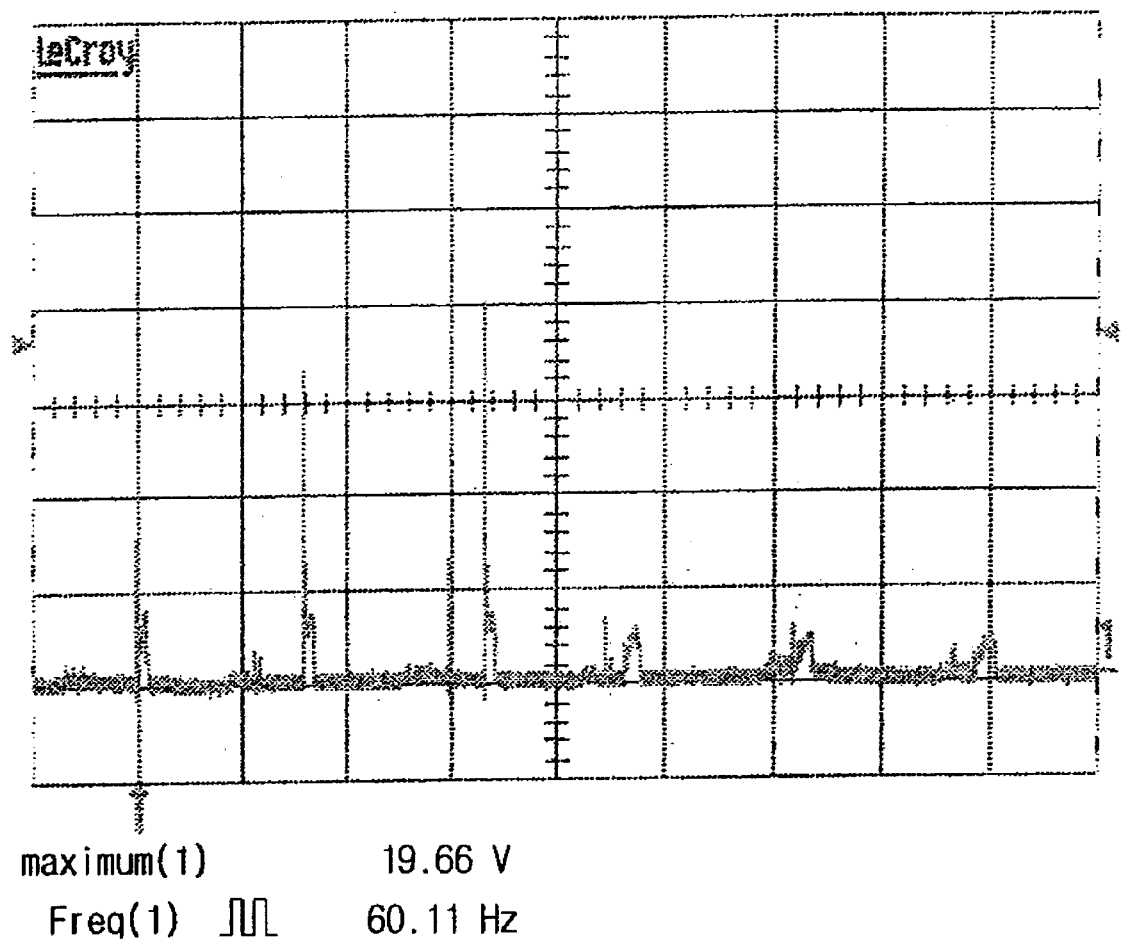
FIG. 18c illustrates a waveform of the signal generated by a harmful arc in the level limiter.

FIG. 18a illustrates a waveform of the signal generated by the start of electronic device in the level limiter, FIG. 18b illustrates a waveform of the signal generated by the operation of the dimmer in the level limiter, and FIG. 18c illustrates a waveform of the signal generated by a harmful arc in the level limiter.

In FIG. 18a, FIG. 18b and FIG. 18c, the reference level is 20V, as shown in FIG. 18a, FIG. 18b and FIG. 18c, the maximum output voltage level is below 20V and the output generated by the operation of the dimmer is relatively lower than the output by the start of electronic device or the harmful arc.

The buffer 1406 performs the buffering of the output signal from the level limiter 1404 in order to provide the stable signal.

The second filter 1408 is a high pass filter as the first filter. The second filter 1408 blocks the low frequency signal outputted form the buffer and passes only the high frequency signal. Although the high pass filtering is performed in the first filter, there may occur other noise during the level limiting and the buffering. Therefore, the second filter removes the noise which occurs during the level limiting and the buffering.

Figure 15A:
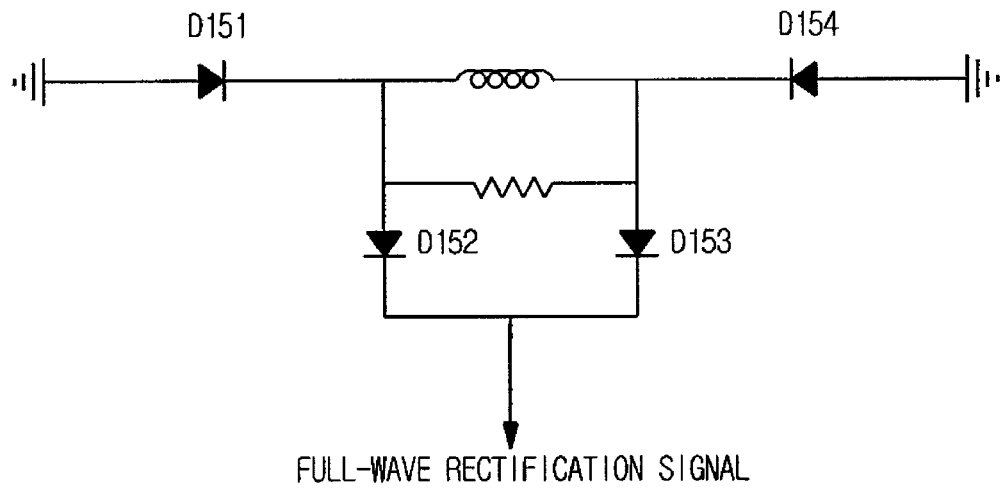
FIG. 15a illustrates a circuit of the rectifier according to a preferred embodiment of the present invention.

FIG. 15a illustrates a circuit of the rectifier according to a preferred embodiment of the present invention.

As, shown in FIG. 15a, the rectifier 1400 according to a preferred embodiment of the present invention may comprise four diodes D151, D152, D153, D154. Four diodes perform full-wave rectification.

Figure 15B:
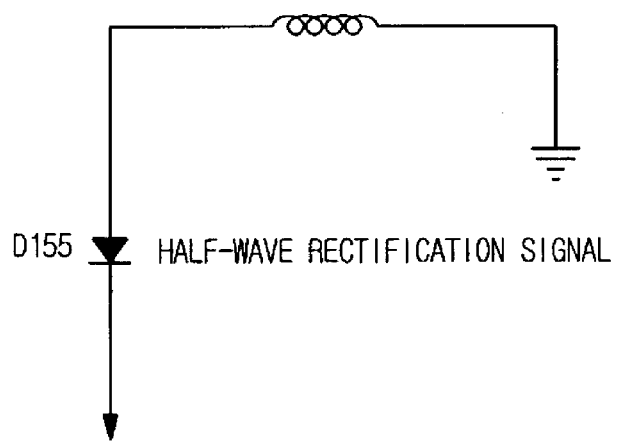
FIG. 15b illustrates a circuit of the rectifier according to another embodiment of the present invention.

FIG. 15b illustrates a circuit of the rectifier according to another embodiment of the present invention.

As shown in FIG. 15b, if just one diode D155 is coupled to the current transformer, a half-wave rectification signal is outputted. In FIG. 15b, the positive part of alternating current passes the diode D155 while the negative part cannot cannot pass the diode D155.

Figure 16:
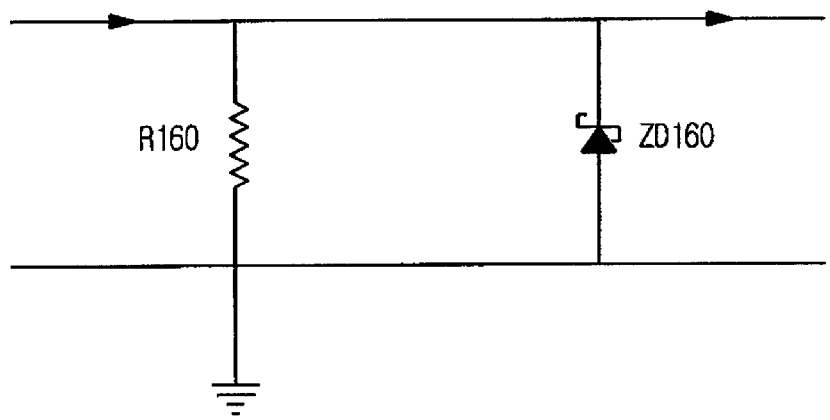
FIG. 16 illustrates a circuit of the level limiter according to a preferred embodiment of the present invention.

FIG. 16 illustrates a circuit of the level limiter according to a preferred embodiment of the present invention.

As shown in FIG. 16, the level limiter according to a preferred embodiment of the present invention may comprise a resistor R160 and a zener diode ZD160.

The output signal from the first filter 1402 is applied to the resistor R160. The zener diode ZD160 limits the voltage applied to the resistor R160. If the regular voltage of the zener diode ZD160 is 20V and the applied voltage to the resistor R160 is 25V, the zener diode ZD160 limits the applied voltage to 20V. Therefore the voltage measured at the resistor R160 is 20V Although method to limit the output level using a zener diode is illustrated in FIG. 16, using other level limiting means will also be included in the scope of the present invention.

Figure 17:
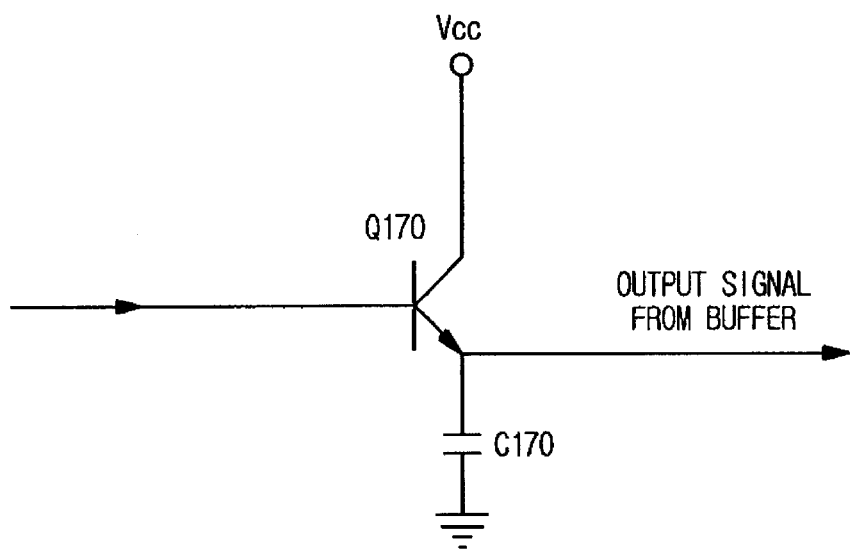
FIG. 17 illustrates a circuit of the buffer according to a preferred embodiment of the present invention.

FIG. 17 illustrates a circuit of the buffer according to a preferred embodiment of the present invention.

As shown in FIG. 17, the buffer 1406 according to a preferred embodiment of the present invention may comprise a bipolar junction transistor Q170 of which the emitter is grounded.

The output signal from the level limiter 1404 is inputted to the base of the transistor Q170. The collector of the transistor Q170 is coupled to a bias voltage $V_{cc}$ and the emitter is grounded. The transistor Q170 of FIG. 17 operates as an emitter follower, of which the output of the emitter is the same as the inputted signal to the base.

A capacitor C170 coupled to the emitter of the transistor Q170 operates as a bypass capacitor, which blocks the direct current signal. Therefore, the capacitor is not the essential element in the buffer.

By the transistor Q170, a more stable signal will be outputted from the emitter. Although an example to constitute the buffer using a bipolar junction transistor is illustrated in FIG. 17, a field effect transistor can also be used as a buffer.

Figure 19:
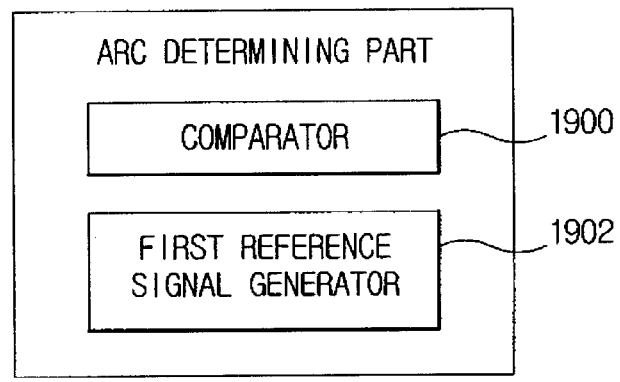
FIG. 19 illustrates a detailed block diagram of the arc determining part according to the preferred embodiment of the present invention.

FIG. 19 illustrates a detailed block diagram of the arc determining part according to the preferred embodiment of the present invention.

As shown in FIG. 19, the arc determining part 1004 may include comparator 1900 and the first reference signal generator 1902.

The first reference signal generator 1902 generates the first reference signal which is the threshold value in determining the arc occurrence and inputs the first reference signal to the comparator 1900. The first reference signal is determined so that the first reference signal is lower than the output by the start of electronic device or the harmful arc, and higher than the output by the operation of a dimmer.

The comparator 1600 compares the output signal from the second filter 1408 with the first reference signal generated from the first reference signal generator 1602, and if the output signal level from the second filter is higher than the first reference signal, the comparator outputs an arc detection signal. In accordance with the preferred embodiment of the present invention, the comparator 1600 may comprise an operational amplifier or an integrated circuit in which an operational amplifier is included. In this case, the first reference signal generated in the first reference signal generator 1602 is a voltage, and the arc detection signal generated in the comparator 1600 is also a voltage.

The comparator 1900 does not generate an arc detection signal if the output from the second filter 1408 is from operation of a dimmer as the first reference signal level is lower that the signal level generated by a dimmer. In order words, the arc determining part classifies the signal output by the sound filter as between a dimmer signal and a non-dimmer signal.

Figure 20:
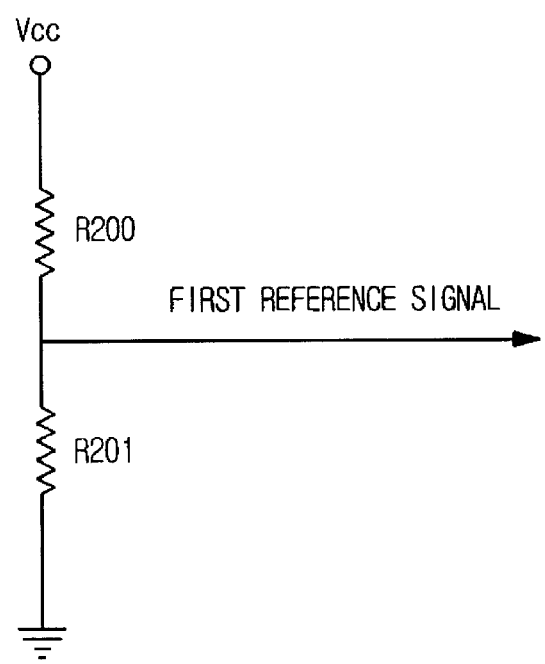
FIG. 20 illustrates a circuit of the first reference signal generator according to a preferred embodiment of the present invention.

FIG. 20 illustrates a circuit of the first reference signal generator according to a preferred embodiment of the present invention.

As shown in FIG. 20, the first reference signal generator according to a preferred embodiment of the present invention may comprise a bias voltage source $V_{cc}$ and two voltage dividing resistors R200, R201. The value of the two resistors R200, R201 is determined so that predetermined first reference signal is applied to the resistor R201.

Figure 21:
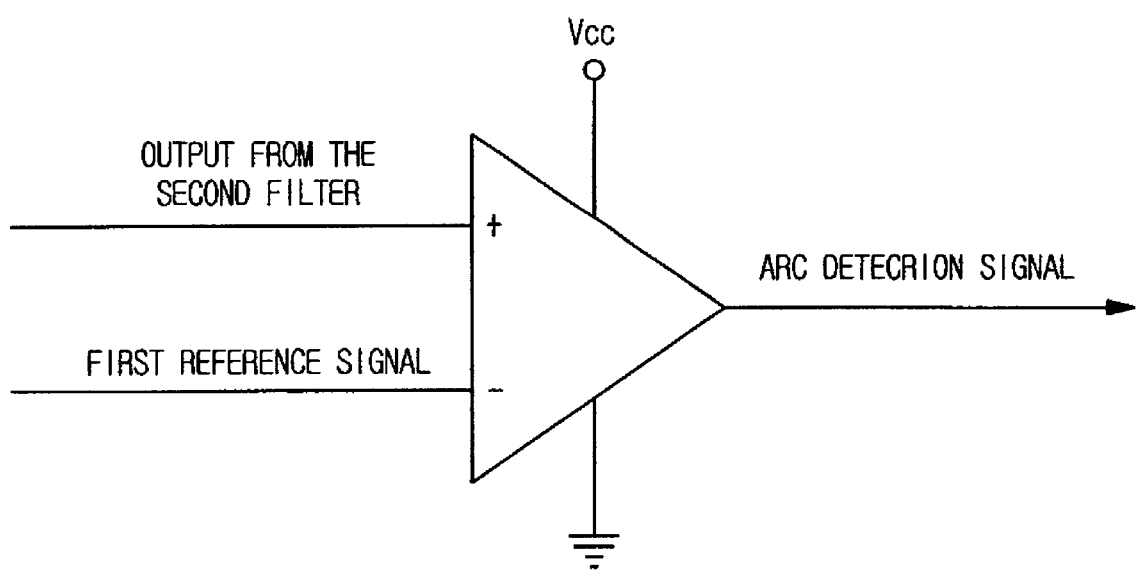
FIG. 21 illustrates a circuit of the comparator according to a preferred embodiment of the present invention.

FIG. 21 illustrates a circuit of the comparator 1900 according to a preferred embodiment of the present invention.

As shown in FIG. 21, the comparator 1900 according to a preferred embodiment of the present invention may comprise an operational amplifier.

In FIG. 21, the output signal from the second filter is inputted to the non-inverting terminal of the operational amplifier and the first reference signal is inputted to the inverting terminal of the operational amplifier.

The operational amplifier generates the arc detection signal if the output signal level from the second filter is higher than the first reference signal. The arc detection signal is inputted to the trip determining part 1006.

Figure 22A:
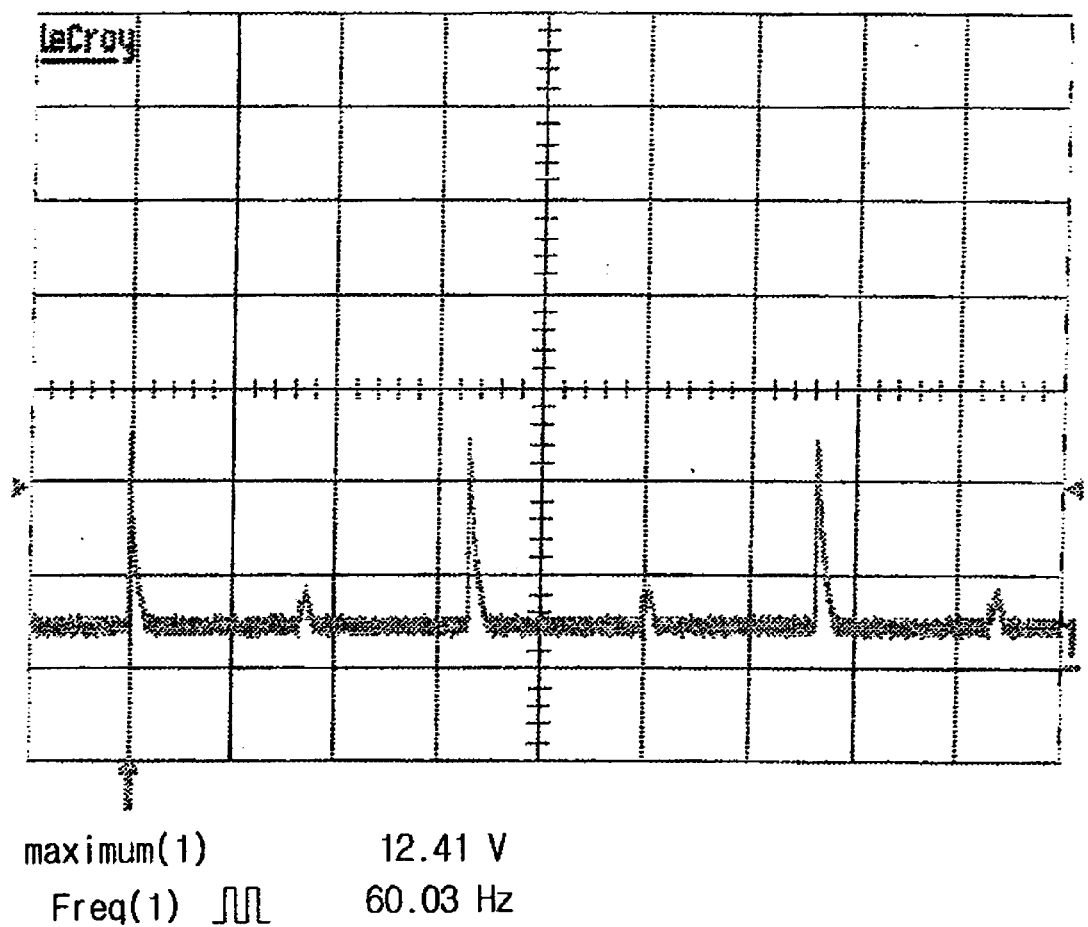
FIG. 22a illustrates a waveform of the signal generated by the start of the electronic device inputted to the comparator.
Figure 22B:
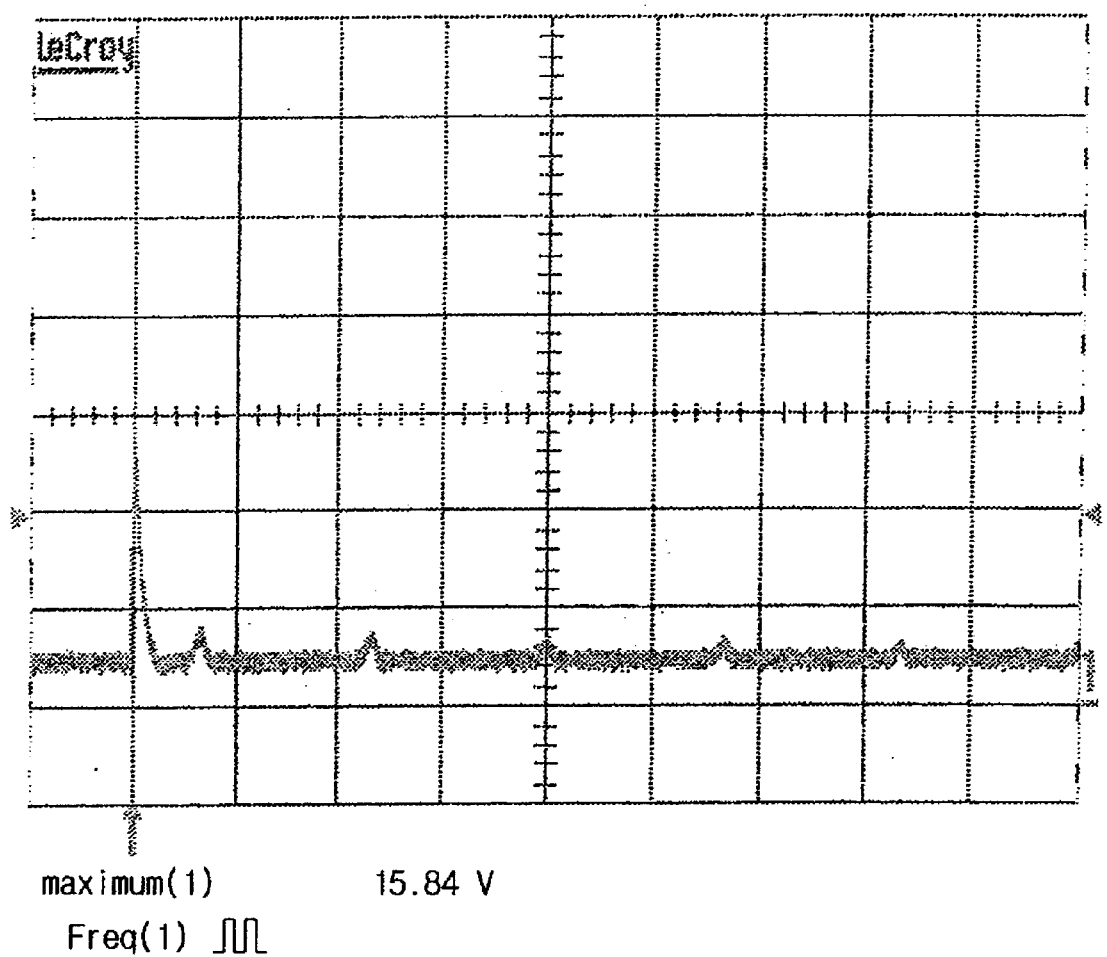
FIG. 22b illustrates a waveform of the signal generated by the operation of the dimmer inputted to the comparator.
Figure 22C:
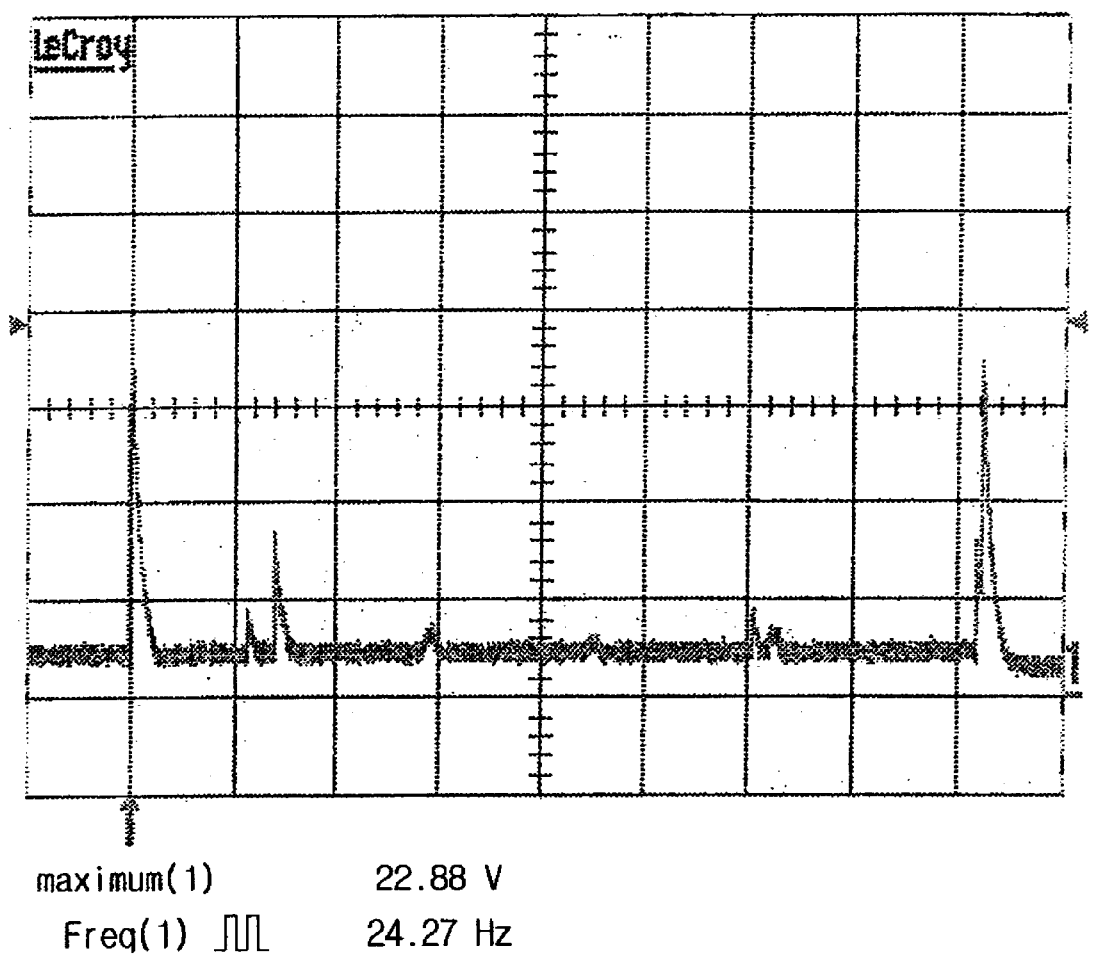
FIG. 22c illustrates a waveform of the signal generated by the harmful arc.

FIG. 22a illustrates a waveform of the signal generated by the start of the electronic device inputted to the comparator, FIG. 22b illustrates a waveform of the signal, generated by the operation of a dimmer, inputted to the comparator, and FIG. 22c illustrates a waveform of the signal generated by the harmful arc.

As shown in FIG. 22a, FIG. 22b and FIG. 22c, the signal level produced by the start of the electronic device and the harmful arc is higher than the signal level by the dimmer. As the signal level by the dimmer is lower than the signal level by the start of the electronic device and the harmful arc, and the first reference signal level is higher than the signal level of the dimmer, the comparator outputs the arc detection signal only for the signal generated by the start of the electronic device and the harmful arc.

Figure 23:
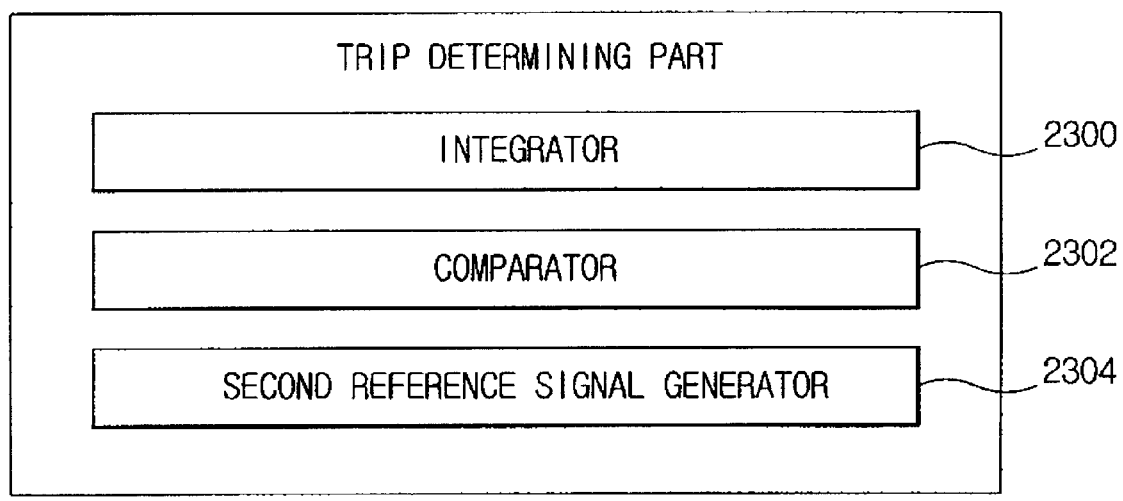
FIG. 23 illustrates a detailed block diagram of the trip determining part according to the preferred embodiment of the present invention.

FIG. 23 illustrates a detailed block diagram of the trip determining part according to the preferred embodiment of the present invention.

As shown in FIG. 23, the trip determining part 1006 may include the integrator 2300, the comparator 2302 and the second reference signal generator 2304.

The integrator 2300 receives the arc detection signal from the comparator 1900 and integrates the arc detection signal. If the arc detection signal is outputted in the form of voltage, the integrator may comprise capacitors for charging the voltage. However, it is included in the scope of the present invention to use other integrating means.

Figure 27A:
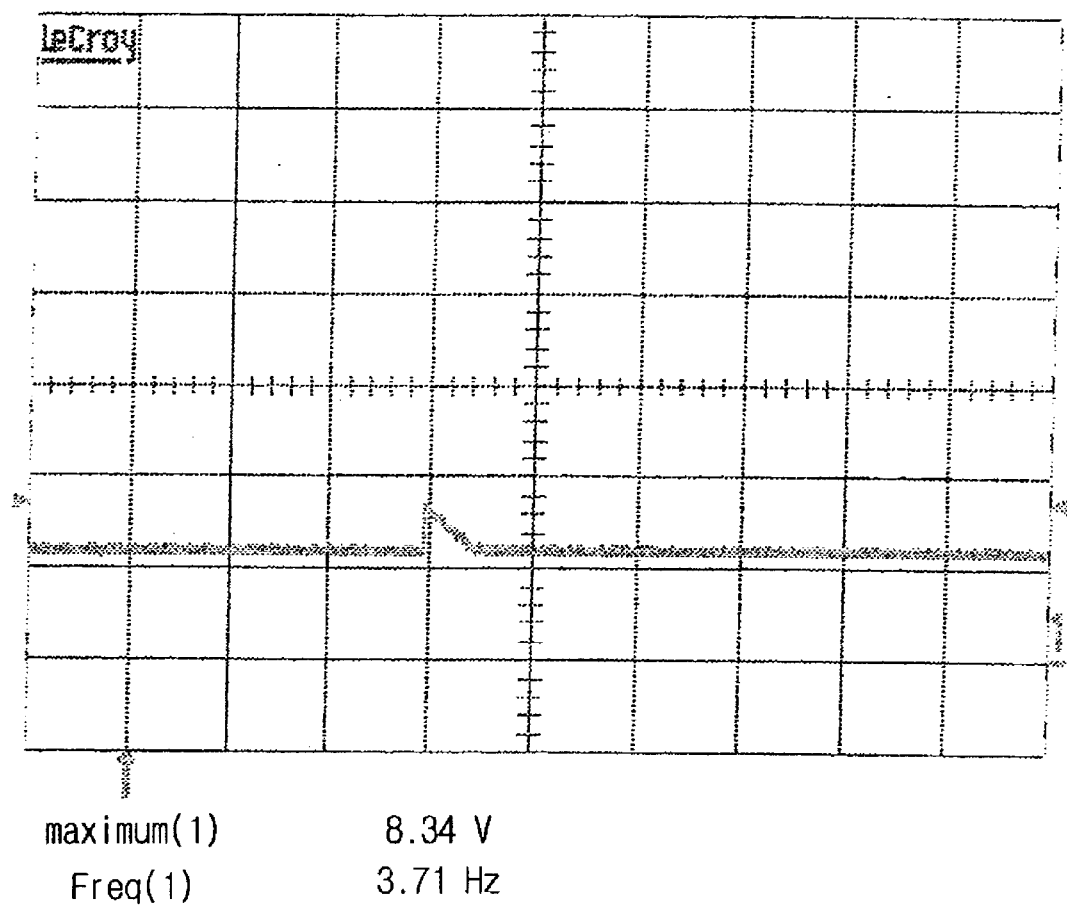
FIG. 27a illustrates a waveform of the signal integrated in the integrator by the start of the electronic device.
Figure 27B:
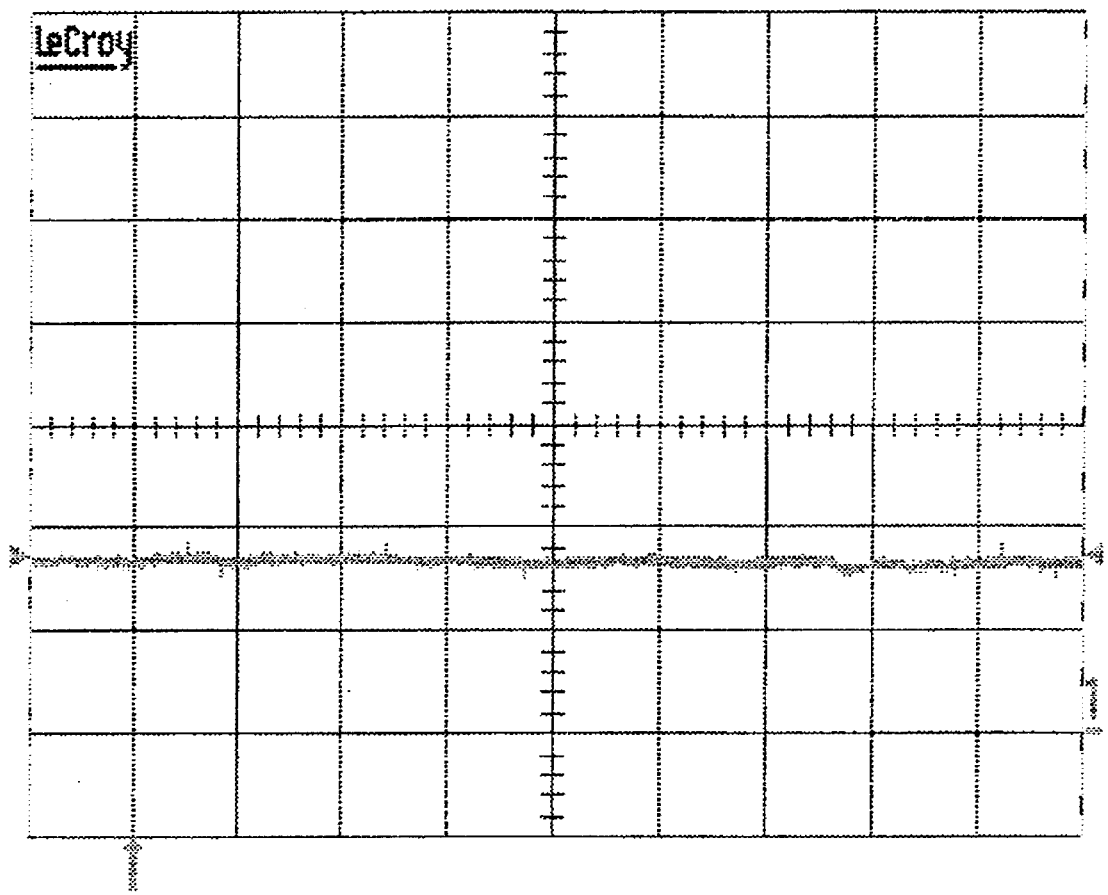
FIG. 27b illustrates a waveform of the signal integrated in the integrator by the operation of a dimmer.
Figure 27C:
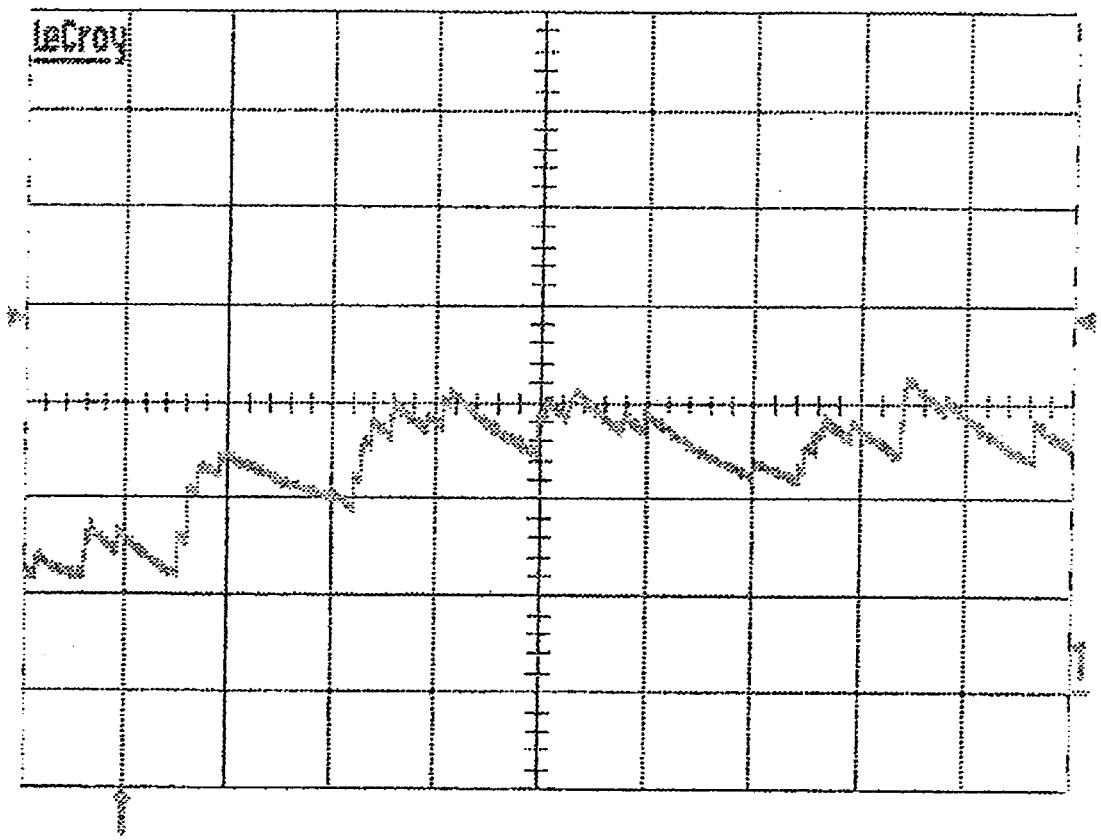
FIG. 27c illustrates a waveform of the signal integrated in the integrator by the harmful arc.

FIG. 27a illustrates a waveform of the signal integrated in the integrator by the start of the electronic device, FIG. 27b illustrates a waveform of the signal integrated in the integrator by the operation of the dimmer and FIG. 27c illustrates a waveform of the signal integrated in the integrator by the harmful arc.

In FIG. 27a, the signal generated by the start of the electronic device is not continuously integrated in the integrator because the signal generated by the start of the electronic device does not last a long time.

In FIG. 27b, as the signal generated by the operation of the dimmer is not determined to be an arc in arc determining part 1004, the arc detection signal is not inputted to the integrator 1800 and the voltage is not charged.

In FIG. 27c, as the signal generated by the harmful arc lasts continuously the voltage level charged in the integrator rises continuously.

The second reference signal generator 2304 generates a predetermined reference signal and inputs the signal to the comparator 2302. The comparator 2302 compares the signal level integrated in the integrator 2300 with the second reference signal generated by the second reference signal generator and if the signal level integrated in the integrator 2300 is higher, the comparator 1802 generates a trip signal. As the comparator 1900 in the arc determining part 1004, the comparator 2302 may comprise an operational amplifier or an integrated circuit in which an operational amplifier is included. At this case, the comparator 1804 generates the trip signal in the form of voltage.

Figure 24:
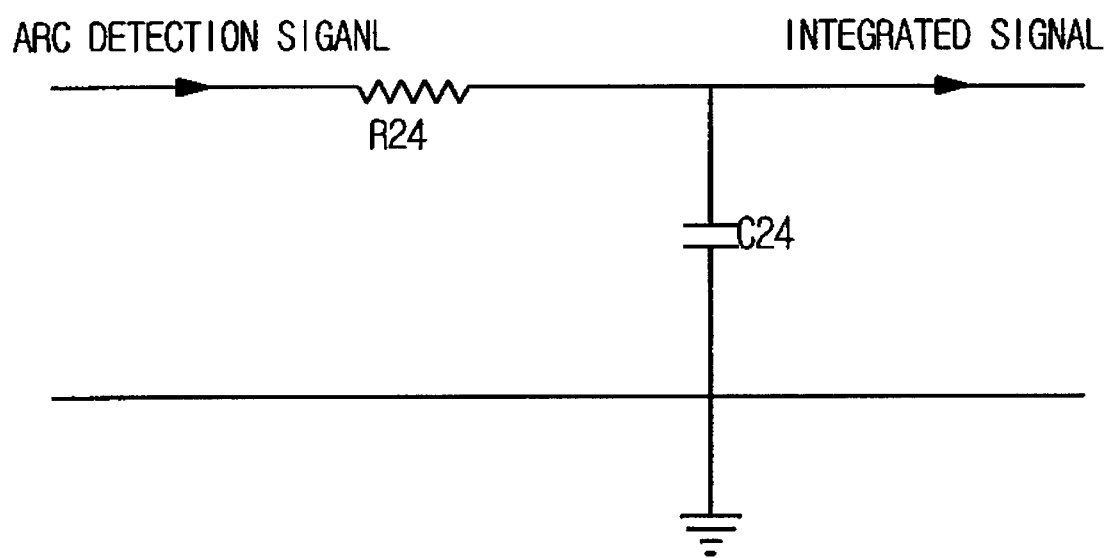
FIG. 24 illustrates a circuit of the integrator 2300 according to a preferred embodiment of the present invention.

FIG. 24 illustrates a circuit of the integrator 2300 according to a preferred embodiment of the present invention.

As shown in FIG. 24, the integrator 2300 according to a preferred embodiment of the present invention may include a resistor R24 and a capacitor C24.

The arc detection signal is continuously charged in the capacitor C24. The time that charging is processed is determined by the value of the resistor R24 and the capacitor C24.

Figure 25:
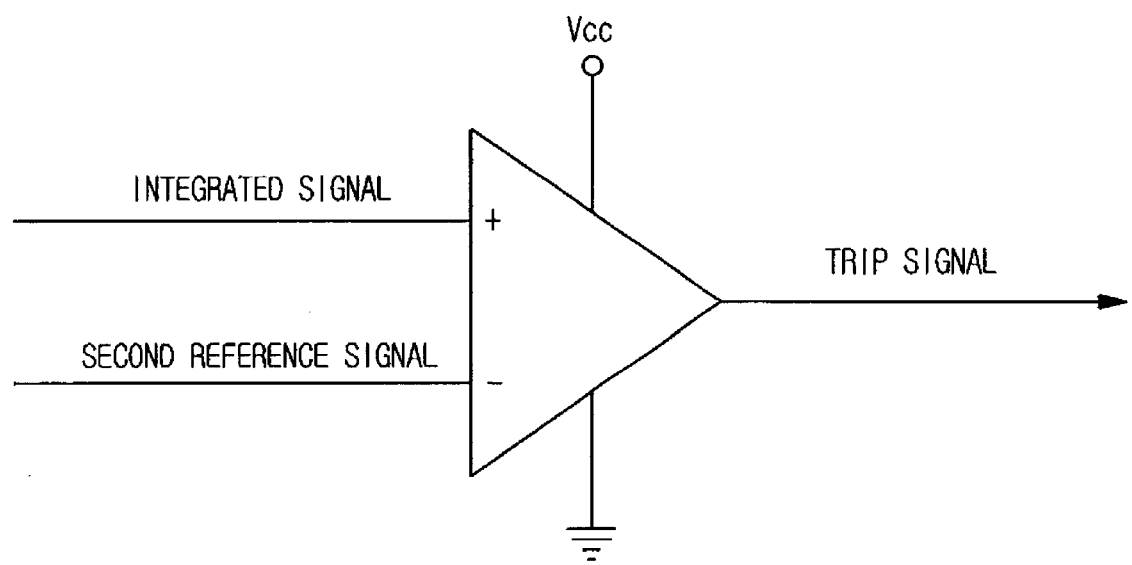
FIG. 25 illustrates a circuit of the comparator 2302 according to the preferred embodiment of the present invention.

FIG. 25 illustrates a circuit of the comparator 2302 according to the preferred embodiment of the present invention.

As shown in FIG. 25, the comparator 2302 according to a preferred embodiment of the present invention may comprise an operational amplifier.

In FIG. 25, the integrated signal is inputted to the non-inverting terminal of the operational amplifier and the second reference signal is inputted to the inverting terminal of the operational amplifier.

The operational amplifier generates the trip signal if the integrated signal level is higher than the second reference signal.

Figure 26:
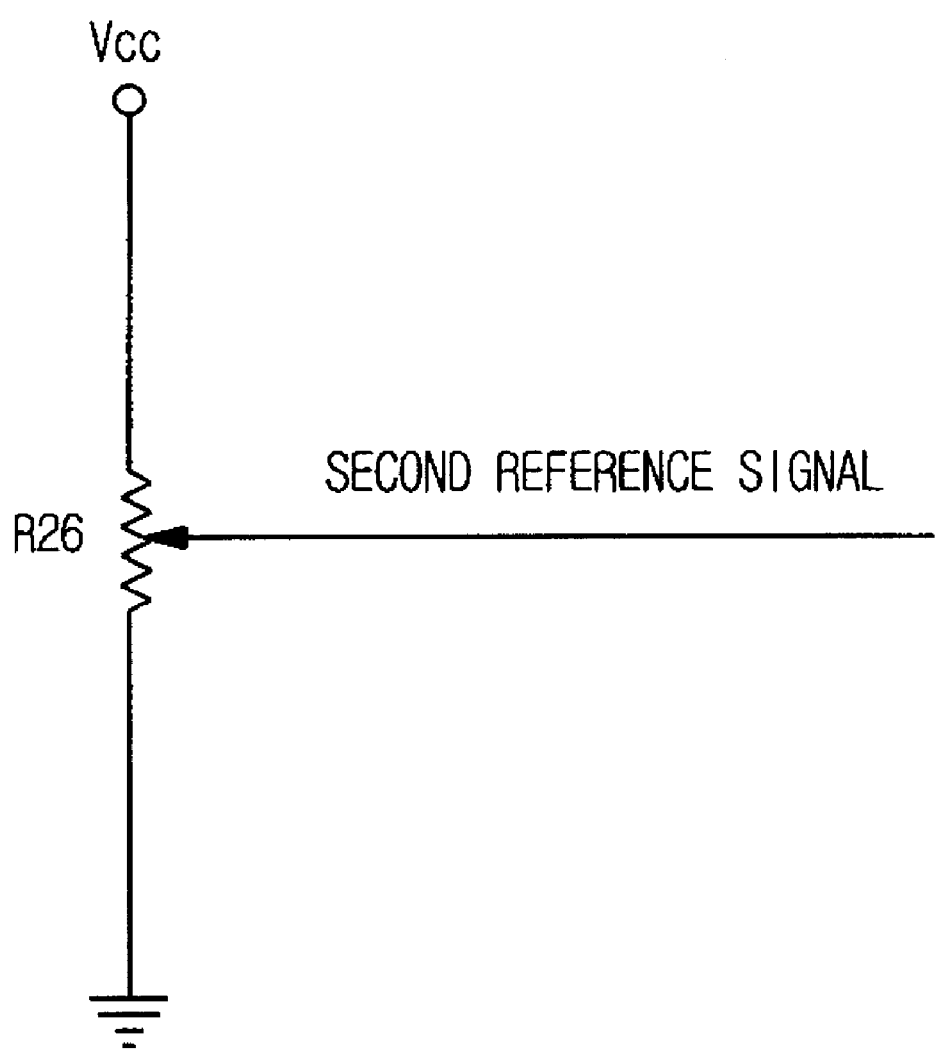
FIG. 26 illustrates a circuit of the second reference signal generator 2304 according to a preferred embodiment of the present invention.

FIG. 26 illustrates a circuit of the second reference signal generator 2304 according to a preferred embodiment of the present invention.

As shown in FIG. 26, the second reference signal generator may comprise a bias voltage $V_{cc}$ source and a variable resistor R26. In FIG. 26, the second reference signal can be adjusted by the state of the variable resistor R26. It is also included in the scope of the present invention to constitute the second reference signal generator using two voltage dividing resistors as in the case of FIG. 20.

Figure 28:
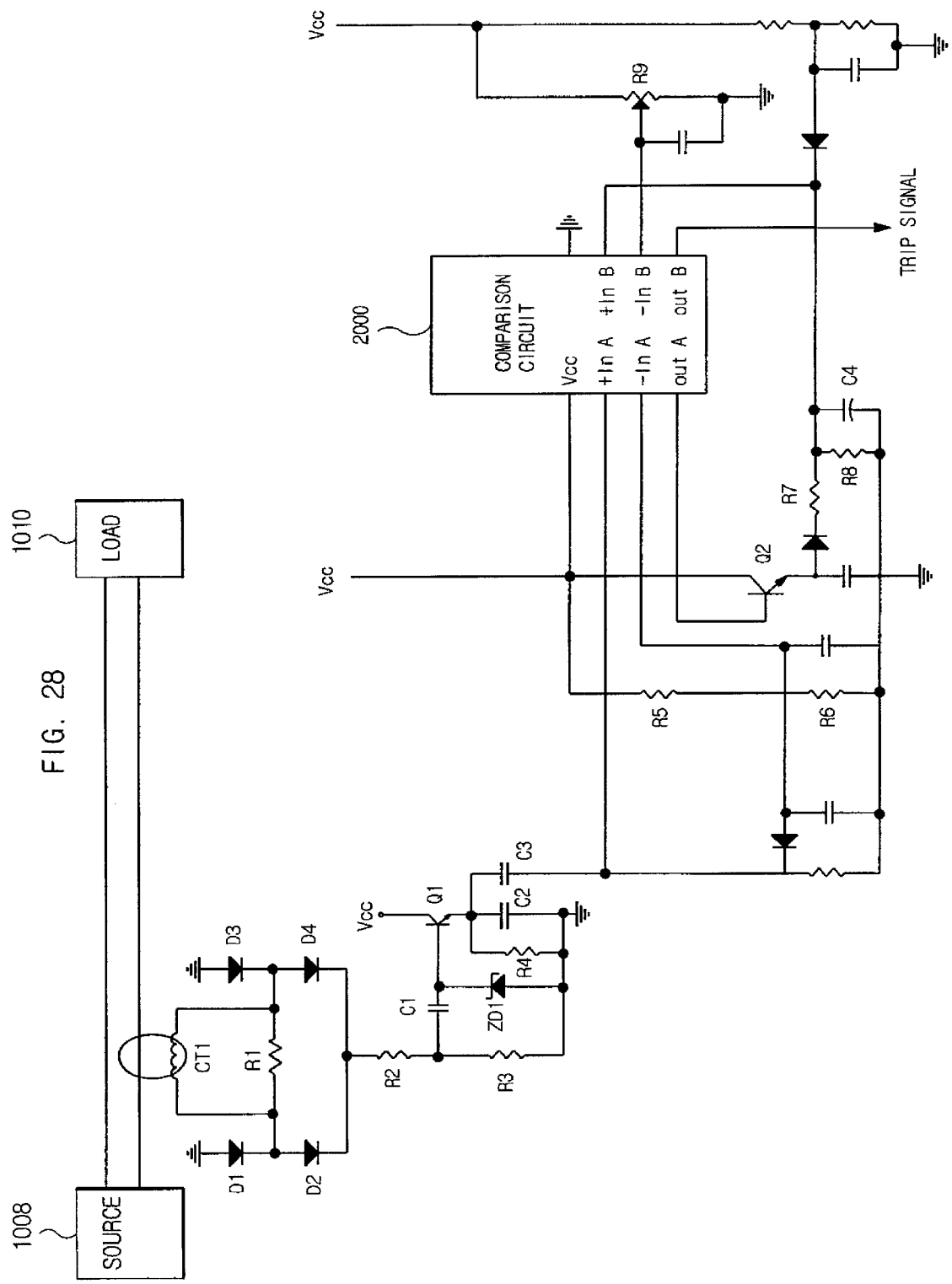
FIG. 28 illustrates a detailed circuit of the arc fault detecting device according to the preferred embodiment of the present invention.

FIG. 28 illustrates a detailed circuit of the arc fault detecting device according to the preferred embodiment of the present invention.

Referencing FIG. 28, the detailed constitution of the arc fault detecting device will be explained below.

In FIG. 20, the current transformer CT1, and the resistor R1 coupled in parallel to the current transformer constitute the current detecting part 1000. The resistor R1 coupled in parallel to the current transformer CT1 attenuates the voltage outputted from the current transformer CT1 so that a stable voltage is inputted to the circuit elements. The value of the resistor R1 is determined so that the voltage generated by the operation of the dimmer is lower than the first reference signal in the arc detecting part.

As shown in FIG. 28, the signal transforming part 1102 comprises four diodes D1, D2, D3, D4, two resistors R2, R3, a capacitor C1, a zener diode ZD1, transistor Q1, two capacitors C2, C3 and a resistor R4 coupled in parallel to the output of the transistor Q1.

Four diodes D1, D2, D3, D4 rectify the output voltage from the current transformer CT1. As mentioned above, although the case of performing full-wave rectification using four diodes D1, D2, D3, D4 is illustrated in FIG. 20, it is also included in the scope of the present invention to perform half-wave rectification using one diode.

Two resistors R2, R3 divide the voltage outputted from the current transformer CT1. The divided voltage produced by the two resistors R2, R3 is inputted to the capacitor C1. The capacitor C1 operates as a high pass filter, which removes the low frequency signal unrelated to arc. The output voltage from the current transformer CT1 is attenuated through voltage dividing and filtering.

The zener diode ZD1 operates as the level limiter, which limits the output voltage from the capacitor C1 to a predetermined voltage if the output voltage from the capacitor exceeds the predetermined voltage. Although the excessive voltage is outputted from the capacitor, only the voltage below the predetermined level will be inputted to the transistor Q1 by the zener diode ZD1.

The transistor Q1 operates as a buffer, which performs the buffering of the output voltage of the zener diode ZD1. As the transistor is the emitter follower, the output of the transistor Q1 is the same signal as the input of the transistor Q1.

The capacitor C2 and the resistor R4 coupled to the emitter of the transistor Q1 operate as a high pass filter, which remove noise occurring during the level limiting and buffering. Another capacitor C3 coupled to the emitter of the transistor Q1 operates as a bypass capacitor which blocks direct current.

As shown in FIG. 28, the arc determining part 1104 comprises a comparison circuit 2000, and resistors R5, R6 that divide voltage for generating the first reference voltage. In FIG. 28, the two resistors R5, R6 coupled in series divides the voltage from the bias voltage $V_{cc}$ so that a predetermined reference voltage is inputted to the comparison circuit 2000. The output voltage from the high pass filter comprising the capacitor C2 and the resistor R4 is inputted to the comparison circuit 2000. The comparison circuit 2000 is the integrated circuit in which plurality of operational amplifiers are included.

The comparison circuit 2000 generates the arc detection signal if the output voltage from the high pass filter is larger than the first reference voltage. As mentioned above, If the output from the high pass filter is generated by the dimmer, the comparison circuit dose not generate the arc detection signal. However, if the output from the high pass filter is generated by the start of the electronic device and the harmful arc, the comparison circuit 2000 generates the arc detection signal.

The arc detection signal which is the output of the comparison circuit 2000 is buffered by the transistor Q2. The buffered signal is provided to the integration circuit comprising a resistor R7 and a capacitor C4. In the capacitor C4 of the integration circuit is charged the arc detection signal from the comparison circuit 2000.

In FIG. 20, the variable resistor R9 is for adjusting the second reference voltage. The charged voltage of the capacitor C4 and the second reference voltage adjusted by the variable resistor R9 are inputted to another input terminal of the comparison circuit 2000. The comparison circuit 2000 generates the trip signal if the charged voltage is larger than the second reference voltage. As mentioned above, as the harmful arc lasts long time, high voltage is charged in the capacitor C4 in case of occurrence of the harmful arc and the comparison circuit generates the trip signal. However, as the signal generated by the start of the electronic device dose not last long time, high voltage is not charged in the capacitor C4 and the comparison circuit 2000 does not generate the trip signal.

What is claimed is:

1. A device for detecting an arc fault coupled to a conductor, the conductor coupling a source and a load in power distribution system, comprising:

current detecting means which detects variance of current on the conductor and generates a current detection signal proportional to the variance of the current;

signal attenuating means which attenuates the current detection signal to output a first attenuated signal;

signal transforming means for removing noise from the first attenuated signal and limiting the level of the first attenuation signal to a predetermined level to produce a second attenuation signal;

means for determining an arc fault occurrence, which compares the second attenuation signal with a predetermined first reference signal level and generates an arc detection signal if the level of the second attenuation signal is higher than the first reference signal level; and means for determining a trip of the conductor which integrates the arc detection signal and generates a trip signal if the integrated arc detection signal level is higher than a predetermined second reference signal level, wherein said signal transforming means comprises a rectifier, which rectifies the first attenuated signal, a first filter which remove low frequency signal components from an output signal of the rectifier, a level limiter which limits an output signal of the first filter to a predetermined level if the output signal of the first filter exceeds the predetermined level, a buffer which performs buffering of an output signal of the level limiter, and a second filter which remove low frequency signal from an output signal of the buffer.

2. The device for detecting an arc fault according to claim 1, wherein said current detecting means comprises a current transformer which generates an output voltage proportional to the variance of the current on the conductor.

3. The device for detecting an arc fault according to claim 1, wherein said signal attenuating means comprises a resistor coupled in parallel to the current transforming means.

4. The device for detecting an arc fault according to claim 3, wherein said resistor of which the value is determined so that an output signal level by the operation of a dimmer is lower than the predetermined level in the level limiter.

5. The device for detecting an arc fault according to claim 3, wherein said resistor of which the value is determined so that an output signal level by the operation of a dimmer is lower than the first reference signal level.

6. The device for detecting an arc fault according to claim 1, wherein said means for determining an arc fault occurrence comprises a first reference signal generator, which generates the predetermined first reference signal, and a comparator, which compares the output signal from the signal transforming means with the first reference signal.

7. The device for detecting an arc fault according to claim 6 wherein said comparator comprises an operational amplifier to which the first reference signal and the first attenuation signal are inputted.

8. The device for detecting an arc fault according to claim 1, wherein said means for determining a trip of the conductor comprises an integrator which integrates the arc detection signal; a second reference signal generator which generates the predetermined second reference signal; and a comparator which compares the integrated arc detection signal with the second reference signal.

9. The device for detecting an arc fault according to claim 8, wherein said integrator comprises at least a resistor and at least a capacitor.

10. The device for detecting an arc fault according to claim 8, said second reference signal generator comprises a variable resistor by which the second reference level is adjusted.

11. The device for detecting an arc fault according to claim 8 or claim 9, wherein said comparator comprises an operational amplifier to which the integrated arc detection signal by the integrator and the second reference signal are inputted.

12. The device for detecting an arc fault according to claim 1, wherein said rectifier comprises four diodes in order to perform full-wave rectification.

13. The device for detecting an arc fault according to claim 1, wherein said rectifier comprises one diode in order to perform half-wave rectification.

14. The device for detecting an arc fault according to claim 1, wherein said first filter is a high pass filter comprising resistors and capacitors.

15. The device for detecting an arc fault according to claim 1, wherein said level limiter comprises a zener diode.

16. The device for detecting an arc fault according to claim 1, wherein said buffer comprises a bipolar junction transistor.

17. The device for detecting an arc fault according to claim 1, wherein said second filter comprises capacitors and resistors which constitute a high pass filter and further comprises a bypass capacitor which removes a direct current signal.

18. The device for detecting an arc fault according to claim 1, wherein said signal attenuating means is a resistor coupled in parallel to the current detecting means.

19. A method for detecting an arc fault on a conductor which connects a source and a load in a power distribution system, comprising steps of
(a) generating a current detection signal which is proportional to a variance of current flowing on the conductor;
(b) attenuating the current detection signal at a predetermined rate to produce a first attenuated signal;
(c) removing noise from the first attenuated signal in said step (b), and limiting the level of attenuated current detection signal to a predetermined level if the first attenuated signal exceeds the predetermined level, thereby to produce a second attenuated signal;
(d) generating an arc detection signal if the level of the second attenuated signal produced in said step (c) is higher than a predetermined first reference level; and
(e) integrating the arc detection signal and generating a trip signal if the integrated arc detection signal level is higher than a predetermined second reference level,
wherein, said step (c) comprises the steps of
  (i) rectifying the first attenuated signal,
  (ii) removing first low frequency signal components from the rectified first attenuated signal,
  (iii) limiting the level of the signal of which the low frequency components are removed so that the signal of which low frequency components are removed does not exceed a predetermined level, buffering the signal of which the level is limited; and
  (iv) removing second low frequency signal components from the buffered signal.

20. The method for detecting an arc fault according to claim 19, wherein the attenuation of the current detection signal in said step (b) is performed using a resistor coupled in parallel to a current detecting means.

21. The method for detecting an arc fault according to claim 19, wherein the said step (e) comprises steps of
integrating an output signal in said step (d);
generating the predetermined second reference signal;
generating the trip signal if the integrated signal level is higher than the second reference signal level.

22. The method for detecting an arc fault according to claim 19, wherein said limiting the level in said step (c) is performed using a zener diode.

23. A device for detecting an arc fault coupled to a conductor coupling a source and a load in power distribution system comprising:
a current detecting means which detects variance of current on the conductor and generates a current detection signal proportional to the detracted variance of the current;
a signal attenuating means which attenuates the current detection signal generated by the current detecting means;
a means for determining an arc fault occurrence, which compares a level of an output signal from the signal attenuating means with a predetermined first reference signal level and generates an arc detection signal if the output signal level from the signal attenuating means is higher than the first reference signal level; and
a means for determining a trip of the conductor which integrates the arc detection signal and generates a trip signal if the integrated arc detection signal level is higher than a predetermined second reference signal level,
wherein the signal attenuation means includes a resistor connected in parallel with the current detecting means, the resistor having a resistance value selected so that an output signal generated by operation of a dimmer is lower than the first reference signal level.

* * * * *